US007046232B2

(12) United States Patent
Inagaki et al.

(10) Patent No.: US 7,046,232 B2
(45) Date of Patent: May 16, 2006

(54) INFORMATION PROCESSING APPARATUS, METHOD OF DISPLAYING MOVEMENT RECOGNIZABLE STANDBY STATE, METHOD OF SHOWING RECOGNIZABLE MOVEMENT, METHOD OF DISPLAYING MOVEMENT RECOGNIZING PROCESS, AND PROGRAM STORAGE MEDIUM

(75) Inventors: Takeo Inagaki, Tokyo (JP); Junko Saito, Tokyo (JP); Keigo Ihara, Chiba (JP); Takahiko Sueyoshi, Tokyo (JP); Yoshihiro Yamaguchi, Tokyo (JP); Shinichiro Gomi, Chiba (JP)

(73) Assignee: Sony Corporation, Tokyo (JP)

( * ) Notice: Subject to any disclaimer, the term of this patent is extended or adjusted under 35 U.S.C. 154(b) by 843 days.

(21) Appl. No.: 09/838,644

(22) Filed: Apr. 19, 2001

(65) Prior Publication Data
US 2002/0006222 A1    Jan. 17, 2002

(30) Foreign Application Priority Data

Apr. 21, 2000  (JP)  ............................. 2000-126342
Apr. 21, 2000  (JP)  ............................. 2000-126343
Apr. 21, 2000  (JP)  ............................. 2000-126344

(51) Int. Cl.
*G09G 5/08*   (2006.01)

(52) U.S. Cl. ................ 345/158; 345/157; 348/333.02; 715/859

(58) Field of Classification Search ............... 345/157, 345/158; 715/705–710, 859, 861; 348/333.02
See application file for complete search history.

(56) References Cited

U.S. PATENT DOCUMENTS 5,018,082 A * 5/1991 Obata et al. ................ 715/707

(Continued)

FOREIGN PATENT DOCUMENTS

WO    WO 00/21023    4/2000

OTHER PUBLICATIONS

Alberto Tomita, Jr. et al., "Extraction of a Person's Handshape for Application in a Human Interface", 2334a IEICE Transactions on Fundamentals of Electronics, Communications and Computer Sciences, vol. E78-A, No. 8, XP-000536050, Aug. 1995, pp. 951-956.

(Continued)

*Primary Examiner*—Kent Chang
(74) *Attorney, Agent, or Firm*—Oblon, Spivak, McClelland, Maier & Neustadt, P.C.

(57)   ABSTRACT

The information processing apparatus allows, based on an image obtained by photographing a user by the CCD camera 8, to recognize the movement direction of the user and when generating a command corresponding to the recognized movement direction, to create the gesture recognition screen 100 in a search state indicating that the apparatus is searching for the user's movement and display it on a liquid crystal display 10 so as to certainly notify the user that the user's movement is recognizable and it is in a standby state. Further, the information processing apparatus allows, before recognizing the movement direction of the user's action based on the image obtained by photographing the user by the CCD camera 8, to generate a gesture recognition screen 100 in advance for making the user visualize a recognizable movement direction and display a target division 107 arranged in a horizontal line on the gesture recognition screen 100 so as to notify the user in advance that right-and-left movement is recognizable, using the target division 107. Furthermore, the information processing apparatus allows, based on the image obtained by photographing the user's hand with the CCD camera 8, to recognize the movement direction of the hand in the image and generate a visual feedback screen representing the trail of the movement of the recognized hand and display it on the liquid crystal display 10 so as to make the user learn on how the movement of the hand was recognized, by feedback.

7 Claims, 15 Drawing Sheets

U.S. PATENT DOCUMENTS

| | | | |
|---|---|---|---|
| 5,214,414 A * | 5/1993 | Levine et al. | 345/157 |
| 5,864,334 A | 1/1999 | Sellers | |
| 6,009,210 A * | 12/1999 | Kang | 382/276 |
| 6,043,805 A | 3/2000 | Hsieh | |
| 6,222,538 B1 * | 4/2001 | Anderson | 715/709 |
| 6,388,181 B1 * | 5/2002 | Moe | 84/477 R |
| 6,388,665 B1 * | 5/2002 | Linnett et al. | 345/473 |
| 6,392,675 B1 * | 5/2002 | Becker et al. | 715/858 |
| 6,690,357 B1 * | 2/2004 | Dunton et al. | 345/158 |

OTHER PUBLICATIONS

Byong K. KO, et al., "Finger Mouse and Gesture Recognition System As a New Human Computer Interface", Computers and Graphics, vol. 21, No. 5, XP-004101109, Sep. 10, 1997, pp. 555-561.

* cited by examiner

INFORMATION PROCESSING APPARATUS, METHOD OF DISPLAYING MOVEMENT RECOGNIZABLE STANDBY STATE, METHOD OF SHOWING RECOGNIZABLE MOVEMENT, METHOD OF DISPLAYING MOVEMENT RECOGNIZING PROCESS, AND PROGRAM STORAGE MEDIUM

BACKGROUND OF THE INVENTION

1. Field of the Invention

The present invention relates to an information processing apparatus, a method of displaying movement recognizable standby state, a method of showing recognizable movement, a method of displaying movement recognizing process, and a program storage medium, and more particularly, is preferably applicable to a notebook personal computer (hereafter referred to as a notebook PC).

2. Description of the Related Art

A notebook PC is composed of a display means such as a liquid crystal display and an input means for inputting commands and characters, such as a keyboard and a mouse so as to execute predetermined processes according to commands entered by key operations and to display the execution results on the display means.

In addition, as the input means other than a keyboard and a mouse, some recent notebook PCs each has a rotating controller of a predetermined shape, that is, a jog dial, sticking out a bit from a side of the notebook PC, so that instructions such as selection of a menu item and determination of a command can be inputted by turning and pressing the jog dial.

By the way, as for such a notebook PC, while a command is inputted by directly operating the input means such as a keyboard, a mouse or a jog dial, on a predetermined active window screen, the active window screen does not necessarily show a user of which input means is effective and that the input means is on standby for the user's input operation. As a result, a problem occurs that it is unfriendly and not easy to use for the user who is unaccustomed to the computer.

Further, such a notebook PC has a problem in that, in the case where a menu item is selected by rotating the jog dial, a user cannot recognize which direction is effective, a right-and left direction or an up-and-down direction, until the user actually manipulates the jog dial.

Furthermore, in such a notebook PC, while it is proposed to photograph a user using an externally connected camera and automatically input a command according to the user's movement, in addition to the above-mentioned keyboard, the mouse and the jog dial, there is a not-friendly and not-easy-to-use problem because when the user inputs a different command by mistake, he/she cannot know what movement brings about the wrong recognition.

SUMMARY OF THE INVENTION

In view of the foregoing, an object of this invention is to provide an information processing apparatus, a method of displaying movement recognizable standby state, and a program storage medium which are much easier to use even for the unaccustomed user.

The foregoing object and other objects of the invention have been achieved by the provision of an information processing apparatus, a method of displaying movement recognizable standby state and a program storage medium, which are capable of certainly informing a user that the apparatus can recognize the movement direction of a recognition subject and also is in a standby state, by recognizing the movement direction of the recognition subject based on a picture obtained by photographing the recognition subject by an image pickup means, and displaying a predetermined standby state picture indicating that the apparatus is searching the recognition subject in the picture on a predetermined display means if the apparatus does not recognize the movement direction of the recognition subject at the time of generating a predetermined command corresponding to the movement direction of the recognition subject recognized.

Another object of the invention is to provide an information processing apparatus, a method of showing recognizable movement, and a program storage medium which are capable of notifying a user in advance of how his/her input operation will be recognized.

The foregoing object and other objects of the invention have been achieved by a provision of an information processing apparatus, a method of showing recognizable movement and a program storage medium which are capable of informing a user of recognizable movement direction using a predetermined recognizable movement direction image picture, by previously creating the recognizable movement direction image which makes the user visualize recognizable movement direction and displaying the image on a predetermined display means, before recognizing the movement direction of a recognition subject based on a picture obtained by photographing the recognition subject by an image pickup means.

Another object of the invention is to provide an information processing apparatus, a method of displaying movement recognizing process and a program storage medium which are capable of making a user learn by feedback on the recognizing process until the movement of the recognition subject is recognized.

The foregoing object and other objects of the invention have been achieved by a provision of an information processing apparatus, a method of displaying movement recognizing process and a program storage medium which are capable of making learn by feedback on how a movement direction of a recognition subject is recognized, by recognizing the movement direction of the recognition subject in a picture obtained by photographing the recognition subject by an image pickup means, creating an recognizing process image indicating a trail of the movement of the recognition subject recognized and displaying the image on a predetermined display means.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Preferred embodiments of this invention will be described with reference to the accompanying drawings:

(1) First Embodiment (1-1) Exterior Features of a Notebook Personal Computer

Figure 1:
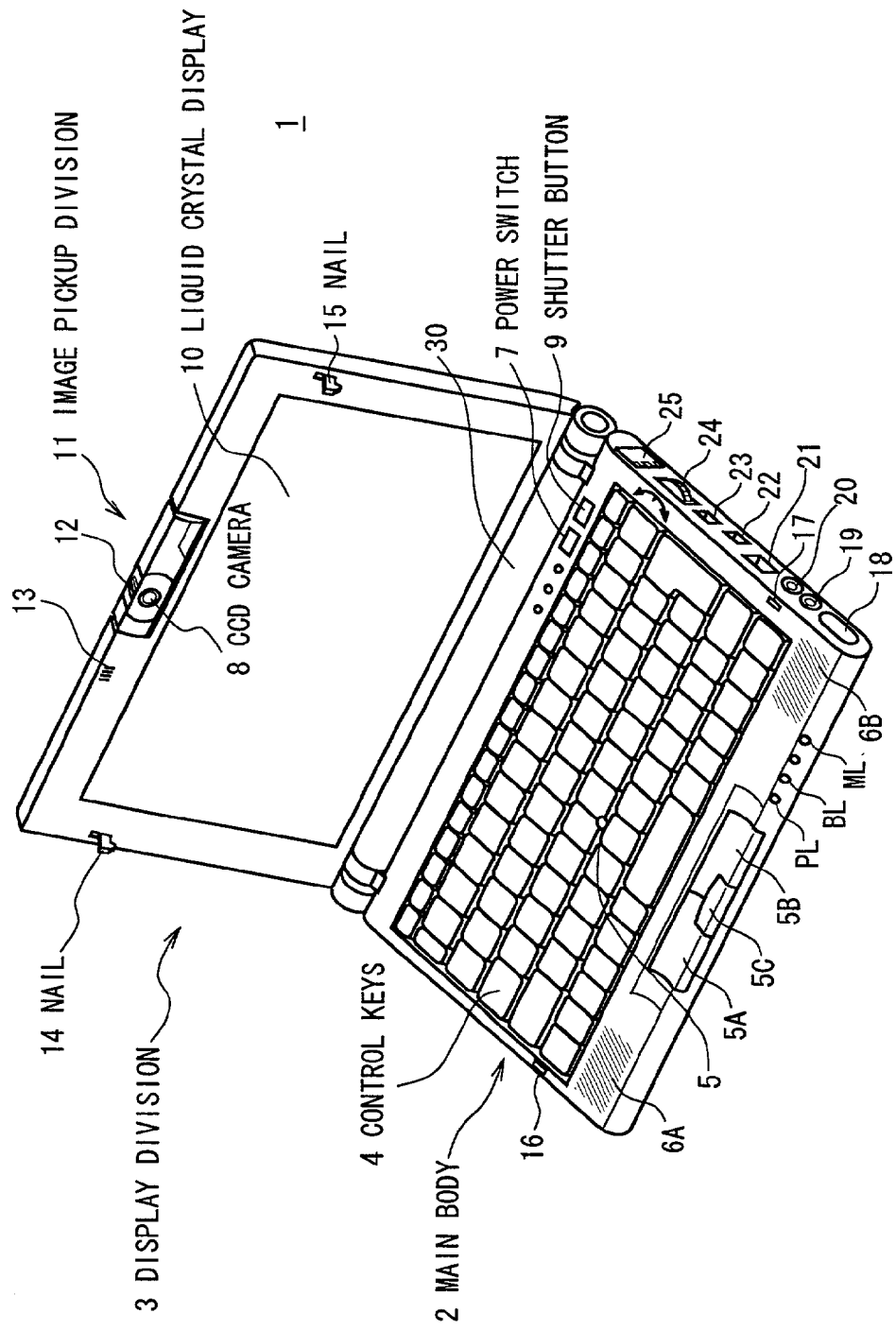
FIG. 1 is a schematic perspective view showing an overall configuration of a notebook personal computer according to a first embodiment of the present invention.

In FIG. 1, a reference numeral 1 shows, as a whole, a notebook personal computer (hereafter referred to as a notebook PC) as an information processing apparatus to which the present invention is applied, and it is configured by a main unit 2 and a display division 3 attached to the main unit 2 so as to be closed or opened.

The main unit 2 has on its topside a plurality of control keys 4 for inputting various characters, codes and numbers, a stick pointing device (hereafter, simply referred to as a stick) 5 used for moving a mouse cursor, left and right click buttons 5A and 5B that are equivalent to the left and right buttons of an ordinary mouse, a center button SC for controlling a scroll bar without putting the mouse cursor on a scroll button, built-in speakers 6A and 6B, a push-type power switch 7, a shutter button 9 for a charge coupled device (CCD) camera 8 provided in the display division 3, a power lamp PL, a battery lamp BL and a message lamp ML which are light emitting diodes (LEDs), and so on.

In the display division 3, on its front, for instance, a liquid crystal display 10 being a thin film transistor (TFT) color liquid crystal of 8.9-inch (1,024×480 pixels) is provided, and besides, at the upper-center of its front, an image pickup division 11 equipped with the CCD camera 8 serving as an image pickup means is rotatably provided.

In this image pickup division 11, the CCD camera 8 can be rotated and positioned within an angle of 180°, facing the front direction to the back direction of the display division 3, and also focus adjustment in photographing a desired image pickup subject with the CCD camera 8 can be performed easily by rotating an adjustment ring 12 provided at the top of the image pickup division 11.

The display division 3 also has a microphone 13 provided on the front and on the back of the image pickup division 11 close to its left and it is possible to collect sounds via the microphone 13 in a large extent from the front to the back of the display division 3.

In addition, the display division 3 has nails 14 and 15 provided close to the left and right of the liquid crystal display 10 respectively, and openings 16 and 17 are provided at the predetermined positions of the main unit 2 corresponding to the nails 14 and 15, so that the nails 14 and 15 are fitted into the corresponding openings 16 and 17 with the front surface of the display division 3 contacted with the top surface of the main unit 2.

In this connection, when the display division 3 contacted with the main unit 2 is tilted, the fitting states between the openings 16 and 17 and the nails 14 and 15 are released and the display division 3 can be opened up from the main unit 2.

Moreover, the main unit 2 has on its right side an infrared port 18 based on the Infrared Data Association (IrDA), a headphone terminal 19, a microphone input terminal 20, a universal serial bus (USB) terminal 21, an external power connector 22, an external display output connector 23, a jog dial 24 capable of inputting an instruction to execute a predetermined process by rotating and pushing the rotating controller, and a modem terminal 25 for a modular jack.

Figure 2:
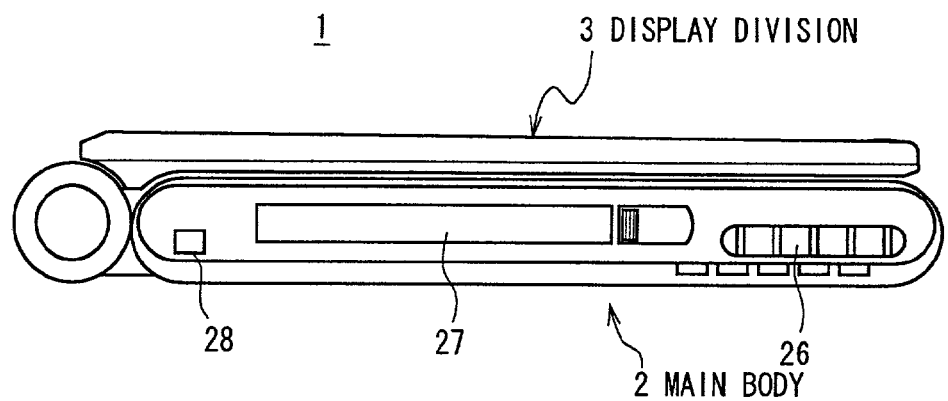
FIG. 2 is a schematic diagram showing a configuration of the left side of the main body.

On the other hand, as shown in FIG. 2, the main unit 2 has on its left side an exhaust hole 26, a personal computer (PC) card slot 27 for a PC card based on the Personal Computer Memory Card International Association (PCMCIA), and an institute of electrical and electronics engineers (IEEE) 1394 terminal 28 for four pins.

Figure 3:
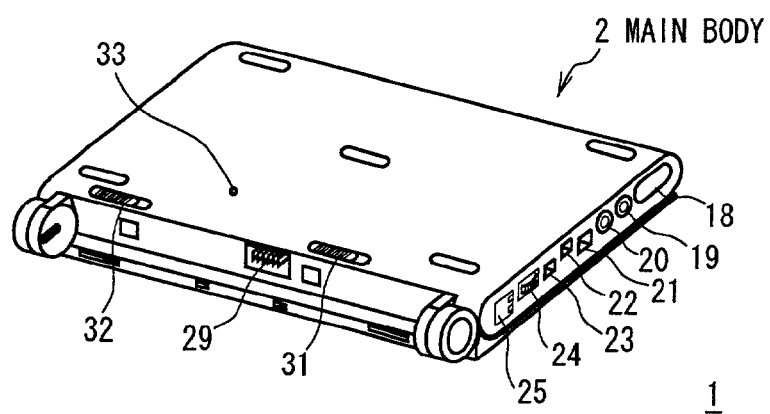
FIG. 3 is a schematic diagram showing the configurations of the backside and the bottom of the main body.

Furthermore, as shown in FIG. 3, the main unit 2 has on its backside a battery connector 29, and it has at its bottom a sliding removing lever 31 for removing a battery pack 30 (FIG. 1) and a lock lever 32 for locking the sliding removing lever 31 and also a reset switch 33 for interrupting operation of the main unit 2 and reconstructing its environment on power-up. The battery pack 30 is detachably connected to the battery connector 29.

(1-2) Circuit Configuration of the Notebook Personal Computer

Figure 4:
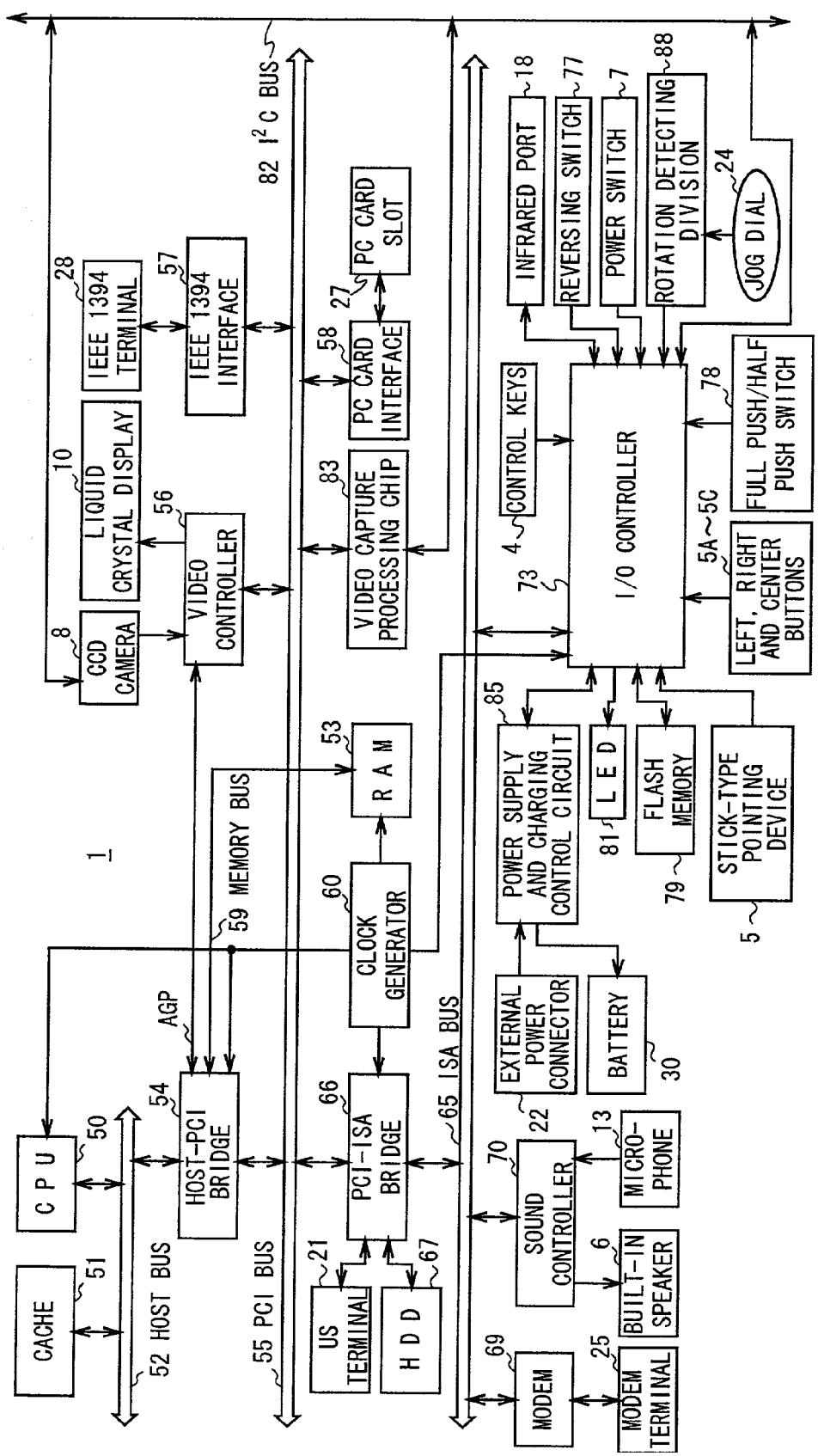
FIG. 4 is a block diagram showing a circuit configuration of the notebook personal computer.

Next, the circuit configuration of the notebook PC 1 will be described in detail with reference to FIG. 4. In the main unit 2 of the notebook PC 1, a central processing unit (CPU) 50 for controlling the whole functions of the main unit 2 is connected with a host bus 52. The CPU 50 executes processes according to programs and application software loaded into a random access memory (RAM) 53, at a predetermined operating speed based on a system clock given from a clock generator 60 so as to realize various functions.

In addition, the host bus 52 is connected to a cache memory 51 in order to cache data to be used by the CPU 50 and to realize high-speed access.

This host bus 52 is connected to a peripheral component interconnect (PCI) bus 55 with a host-PCI bridge 54, and the PCI bus 55 is connected to a video controller 56, an IEEE 1349 interface 57, a video capture processing chip 83, and a PC card interface 58.

Here, the host-PCI bridge 54 controls sending and receiving of various data between the CPU 50 and the video controller 56, the video capture processing chip 83, the IEEE 1349 interface 57 and the PC card interface 58, and also performs memory control of the RAM 53 connected with a memory bus 59.

In addition, the host-PCI bridge 54 is connected to the video controller 56 with a signal wire being an accelerated graphics port (AGP), and it is thereby possible to transfer image data at high speed between the video controller 56 and the hostPCI bridge 54.

The video capture processing chip 83 is connected with an $I^2C$ bus 82 (also referred to as system management (SM) bus generally) being a serial bus, and if image data photographed by the CCD camera 8 is supplied through the $I^2C$ bus 82, it is stored in a built-in frame memory (not shown) once to generate JPEG image data by performing an image compression process based on the joint photographic experts group (JPEG) standards, and then the JPEG image data is stored in the frame memory again.

Then, the video capture processing chip 83 transfers the JPEG image data stored in the frame memory to the RAM 53 in response to a request from the CPU 50 by using a bus master function, and then the JPEG image data is transferred to a hard disk drive (HDD) 67 as JPEG image (still picture) data or Motion JPEG (motion picture) data.

In addition, the video controller 56 outputs image data based on various application software provided at appropriate times and image data photographed by the CCD camera 8, to the liquid crystal display 10 of the display division 3 so as to display a plurality of window screens.

The IEEE 1349 interface 57 is directly connected to the IEEE 1394 terminal 28, and can be connected to another computer apparatus and an external device such as a digital video camera with the IEEE 1394 terminal 28.

The PC card interface 58 is to be connected to a PC card (not shown) which is loaded in a PC card slot 27 when an optional function is to be added, and can be connected to an external device such as a compact disc-read only memory (CD-ROM) drive or a digital versatile disc (DVD) drive with the PC card.

The PCI bus 55 is connected to an industrial standard architecture (ISA) bus 65 with the PCI-ISA bridge 66, and the PCI-ISA bridge 66 is connected to the HDD 67 and a USB terminal 21.

Here, the PCI-ISA bridge 66 is comprised of an integrated drive electronics (IDE) interface, a configuration register, a real-time clock (RTC) circuit, a USB interface and so on, and it controls the HDD 67 via the IDE interface based on the system clock given from the clock generator 60.

A hard disk of HDD 67 stores an operating system (OS) such as Windows 98 (trademark), an electronic mail program, an auto pilot program, a jog dial server program, a jog dial driver, capture software, digital map software and other various application software, which are transferred and loaded into the RAM 53 at appropriate times in a starting process.

Moreover, the PCI-ISA bridge 66 controls via the USB interface (not shown) external devices such as a floppy disk drive, a printer and a USB mouse connected to the USB terminal 21, and also controls a modem 69 and a sound controller 70 connected with the ISA bus 65.

The modem 69 is connected to an Internet service provider (hereafter referred to as a provider) using the modem terminal 25 with the public telephone circuit (not shown), and performs dialup IP connection to the Internet via the provider.

The sound controller 70 generates audio data by converting an audio signal collected by the microphone 13 into an analog form, and outputs it to the CPU 50, and also converts the audio data supplied from the CPU 50 into an analog form to generate an audio signal which is outputted to outside via the built-in speaker 6.

In addition, the ISA bus 65 is connected to an in/out (I/O) controller 73, and it receives electric power supplied from an external power source via an external power connector 22 and a power supply and charging control circuit 85 to supply power to each circuit when the power switch 7 is turned on. Note that, the I/O controller 73 also operates based on the system clock given from the clock generator 60.

Moreover, the power supply and charging control circuit 85 controls charging of the battery pack 30 connected to the battery connector 29 (FIG. 3) under the control of the I/O controller 73.

The I/O controller 73 is composed of a microcontroller, an I/O interface, a CPU, a ROM, a RAM and so on, and controls input/output of data between the OS and application software and various peripherals such as the liquid crystal display 10 and the HDD 67, based on a basic input/output system (BIOS) stored in a flash memory 79.

In addition, the I/O controller 73 is connected to the infrared port 18 and is capable of performing infrared communication with another computer apparatus for instance.

Furthermore, the I/O controller 73 is connected to a reversing switch 77 which is turned on when the image pickup division 11 is rotated toward the backside of the liquid crystal display 10 by 180 degrees. Then, the I/O controller 73 informs the CPU 50 of this situation, via the PCI-ISA bridge 66 and the host-PCI bridge 54.

In addition, the I/O controller 73 is connected to a full/half push switch 78, and the full/half push switch 78 is in a half push state when the shutter button 9 provided on the topside of the main unit 2 is half pushed. Then, the I/O controller 73 informs the CPU 50 of this situation. On the other hand, the switch 78 is in a full push state when the button 9 is fully pushed, and then the I/O controller 73 informs the CPU 50 of this situation.

To be more specific, the CPU 50 enters a still picture mode when the shutter button 9 is half pushed by a user in a state where capture software is started up from the hard disk of the HDD 67 on the RAM 53, and it controls the CCD camera 8 to freeze the still picture, and then when the shutter button 9 is fully pushed, it captures the frozen still picture data and sends it to the video controller 56.

On the contrary, the CPU 50 enters a motion picture mode when the shutter button 9 is fully pushed by the user without starting up the capture software, and it captures a motion picture for 60 seconds at maximum and sends it to the video controller 56.

Incidentally, the ROM of the I/O controller 73 stores a wakeup program, a key input monitoring program, an LED control program, a jog dial state monitoring program and other various control programs.

Here, the jog dial state monitoring program is a program used accompanying with the jog dial server program stored in the hard disk of the HDD 67 and is intended to monitor whether or not the jog dial 24 is rotated or pushed.

The wakeup program is a program which executes a given process when a current time from an RTC circuit in the PCI-ISA bridge 66 coincides with a preset starting time, under the control of the CPU 50. The key input monitoring program is a program for monitoring input from the control keys 4 and other various key switches. The LED control program is a program for controlling lighting of various lamps such as the power lamp PL, the battery lamp BL and the message lamp ML (FIG. 1).

In addition, the RAM of the I/O controller 73 has an I/O register for the jog dial state monitoring program, a set time register for the wakeup program, a key input monitoring register for the key input monitoring program, a LED control register for the LED control program and registers for other various programs.

The set time register stores time information on a starting time preset by the user in order to use in the wakeup program. Therefore, the I/O controller 73 determines whether or not the current time from the RTC circuit coincides with the preset starting time based on the wakeup program, and when they coincide with each other, the register informs the CPU 50 of this situation.

Then, the CPU 50 starts up predetermined application software at the preset starting time, and executes a predetermined process according to the application software.

Moreover, the key input monitoring register stores control key flags corresponding to input operations of the control keys 4, the stick 5, the left click button 5A, the right click button 5B, the center button 5C and so on.

Therefore, the I/O controller 73 determines, according to the key input monitoring program, whether or not the stick 5 is pointed or the left click button 5A, the right click button SB or the center button 5C was clicked, based on the control key flags, and when the pointing or click operation was performed, the I/O controller 73 informs the CPU 50 of this situation.

This pointing operation here is an operation of manipulating the stick 5 up and down and right and left by a finger to move the mouse cursor to a desired position on the screen, and the click operation is an operation of swiftly pushing and releasing the left click button 5A or the right click button 5B by a finger.

Then, the CPU 50 executes a predetermined process depending on the movement of the cursor by the pointing operation or the click operation.

In addition, the LED control register stores lighting flags for indicating a lighting state of various lamps such as the power lamp PL, the battery lamp BL and the message lamp ML.

Therefore, the I/O controller 73 stores the lighting flags and controls the LEDs 81 based on the lighting flags and for example, lights the message lamp ML when the CPU 50 starts up the electronic mail program from the hard disk of the HDD 67 in response to the pushing operation of the jog dial 24 and receives electronic mail according to the electronic mail program.

Moreover, the I/O register for the jog dial state monitoring program stores a rotation flag and a push flag corresponding to rotating and pushing operations of the jog dial 24.

Therefore, when a desired menu item is selected by the user out of a plurality of menu items by rotating and pushing the jog dial 24 connected to a rotation detecting division 88, the I/O controller 73 sets the rotation flag and the push flag stored in the I/O register and informs the CPU 50 of this situation.

Thus, the CPU 50 starts up application software corresponding to the menu item determined by rotating and pushing the jog dial 24 to execute the predetermined process, according to the jog dial server program read from the HDD 67 and started up on the RAM 53.

Here, the I/O controller 73 is always in operation under the control of the power supply and charging control circuit 85 even if the power switch 7 is off and the OS is not active, so that application software or a script file desired by the user can be started up by pushing the jog dial 24 which is in a power-saving state or in a power-off state, without providing a special key.

Moreover, the I/O controller 73 is also connected with the I²C bus 82, and adjusts brightness and contrast in the CCD camera 8 by supplying various setting parameters for the CCD camera 8 set by the control keys 4 or the jog dial 24 through the I²C bus 82.

(1-3) Gesture Recognizing Process

In addition to such configuration, the notebook PC 1 starts up application software called a cyber gesture program for recognizing the movement of the user's hand (gesture) photographed by the CCD camera 8, from the hard disk of the HDD 67, and recognizes the movement of the user's hand photographed by the CCD camera 8 in accordance with the cyber gesture program and executes a predetermined process depending on the recognition result on the active window screen based on the application software.

To be more specific, for instance, in the case of starting up the image editing program capable of processing photographed still pictures and sequentially displaying a plurality of still pictures stored in the hard disk of the HDD 67 on the liquid crystal display 10 in order to select still pictures to be processed, the notebook PC 1 performs an image forwarding operation such as forwarding and playing back the still pictures displayed on the liquid crystal display 10 one by one in response to the rotating operation of the jog dial 24 by the user. The present invention, however, allows the above-mentioned image forwarding operation to be executed under the control of the CPU 50 without contacting the jog dial 24, by having the CPU 50 recognize the movement of the user's hand photographed by the CCD camera 8.

In this connection, the notebook PC 1 forwards the still picture by only one on the liquid crystal display 10 when the jog dial 24 is rotated further toward the depth from the user by more than a predetermined angle and on the contrary, plays back the still pictures by only one on the liquid crystal display 10 when the jog dial 24 is rotated toward the user by more than a predetermined angle.

Figure 5:
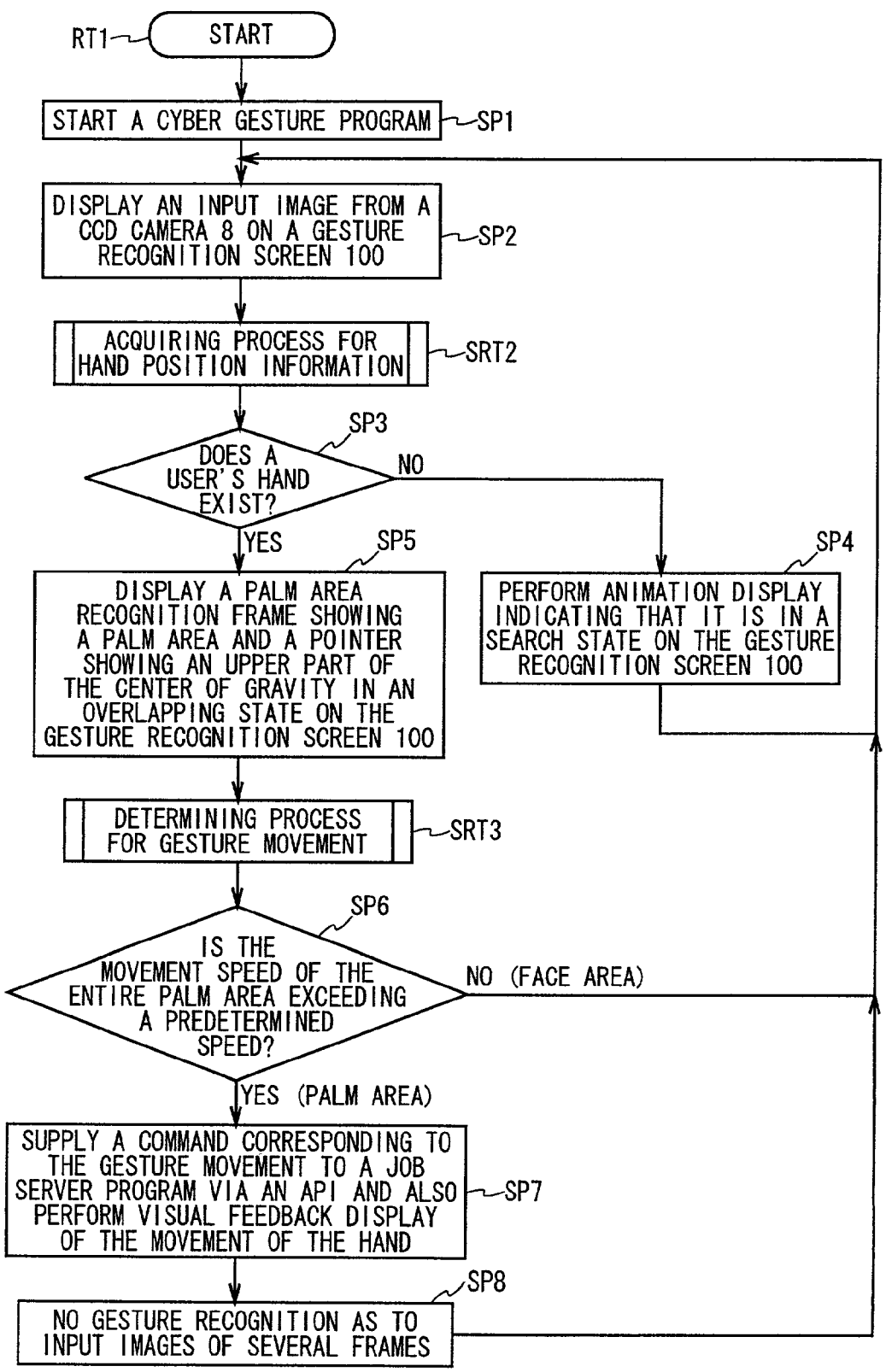
FIG. 5 is a flowchart showing a gesture recognizing processing procedure.
Figure 6:
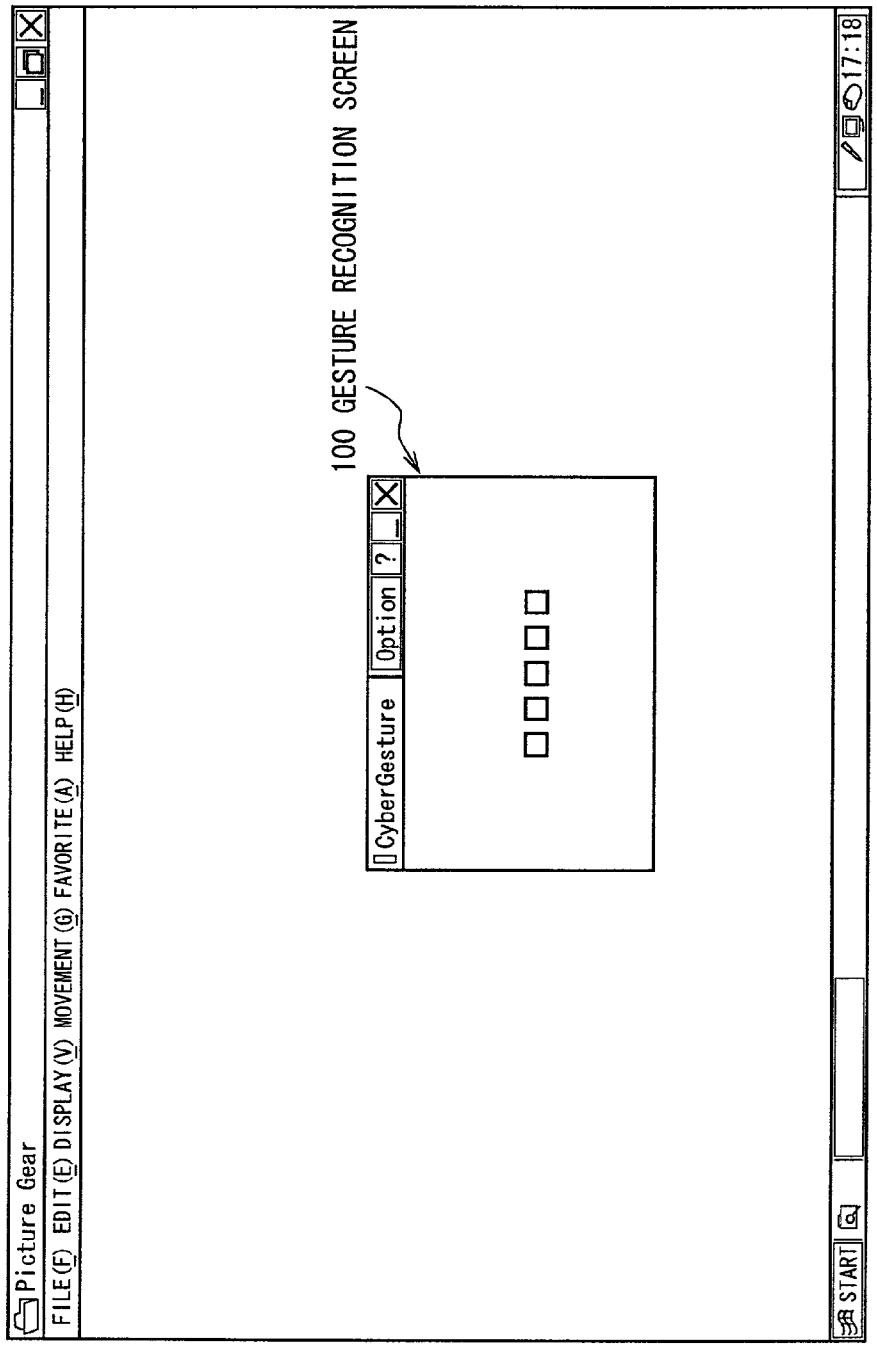
FIG. 6 is a schematic diagram showing a gesture recognition screen displayed overlapping on the active window screen.

In actual, the CPU 50 of the notebook PC 1 enters a routine RT1 at starting step in FIG. 5 and moves to the next step SP1, and starts up the cyber gesture program from the hard disk of the HDD 67 by the user's operation, and creates a gesture recognition screen 100 as shown in FIG. 6 according to the cyber gesture program, and then moves on to the next step SP2 after overlapping and displaying it on the still picture of the active window screen according to the image editing program.

Figure 7:
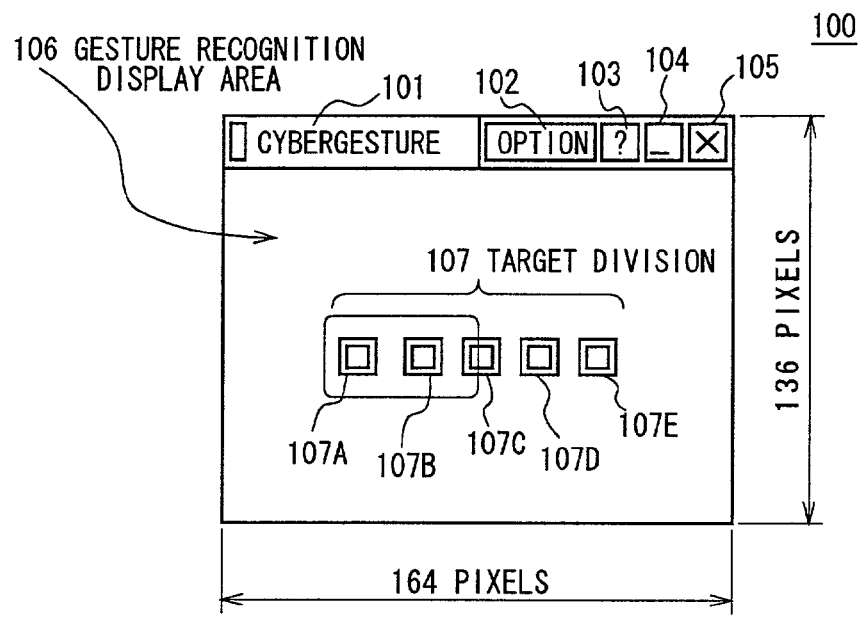
FIG. 7 is a schematic diagram showing a configuration of the gesture recognition screen.
Figure 8:
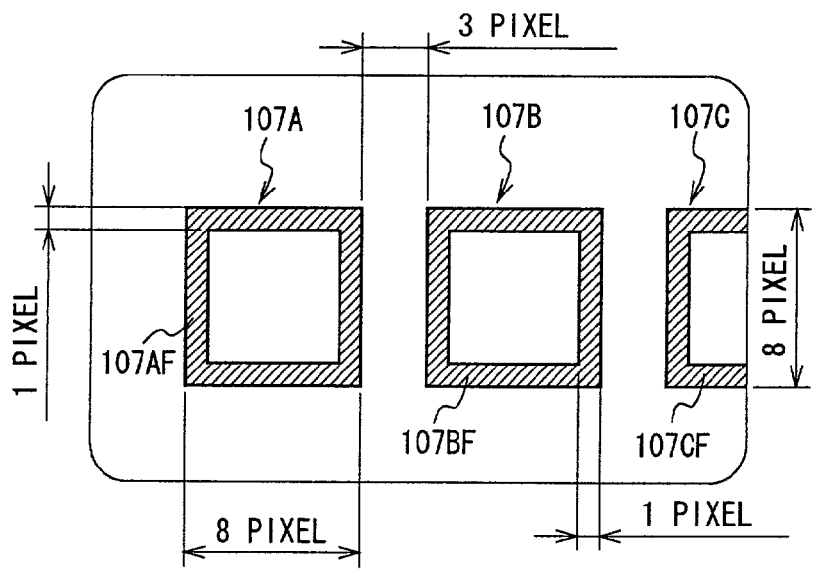
FIG. 8 is a schematic diagram showing a configuration of a target.

Here, as shown in FIG. 7, the gesture recognition screen 100 has a screen size of 164×136 pixels, in which a title character division 101 of "CYBERGESTURE" (trademark of Sony Corp.) indicating the cyber gesture program, an option button 102 for optionally selecting a function, a help button 103, a minimizing button 104 and a closing button 105 are provided at the top.

This gesture recognition screen 100 is formed in a screen size much smaller than that of the liquid crystal display 10 (1,024×480 pixels) so that the area concealing the still picture displayed behind the gesture recognition screen 100 on the active window screen becomes as small as possible.

Moreover, when the mouse cursor is put on any of the option button 102, the help button 103, the minimizing button 104 and the closing button 105 on the gesture recognition screen 100, the CPU 50 of the notebook PC 1 displays the put button in a convex state, and displays it in a concave state after selection by clicking, which allows the selecting and determining operation of the buttons to be easily and visually recognized.

In addition, the CPU 50 of the notebook PC 1 displays the gesture recognition display area 106 on the gesture recognition screen 100 on a 256-level gray scale, and also displays a target division 107 comprised of five square targets 107A to 107E arranged in a horizontal line approximately at the center of the gesture recognition display area 106.

Thus, the CPU 50 is capable of easily making him/her visualize that the notebook PC 1 can recognize right and left movement of the user's hand, by using the target division 107 displayed in the gesture recognition display area 106 on the gesture recognition screen 100.

In addition, each target 107A to 107E has a size of 8×8 pixels, with a frame 107AF to 107EF of 1-pixel width. The frames 107AF to 107EF are colored in red so as to make the targets 107A to 107E more visually remarkable against the gray scale display behind.

Moreover, the gesture recognition display area 106 on the gesture recognition screen 100 has a black line (not shown) for every two horizontal lines of scan lines, so that the user can easily recognize this area as the gesture recognition screen 100, which is different from a screen showing an ordinary image.

At step SP2, the CPU 50 photographs the user existing in front of the display division 3 with the CCD camera 8, and displays the resultant input image in the gesture recognition display area 106 on the gesture recognition screen 100, and then moves on to the next subroutine SRT2.

Figure 9:
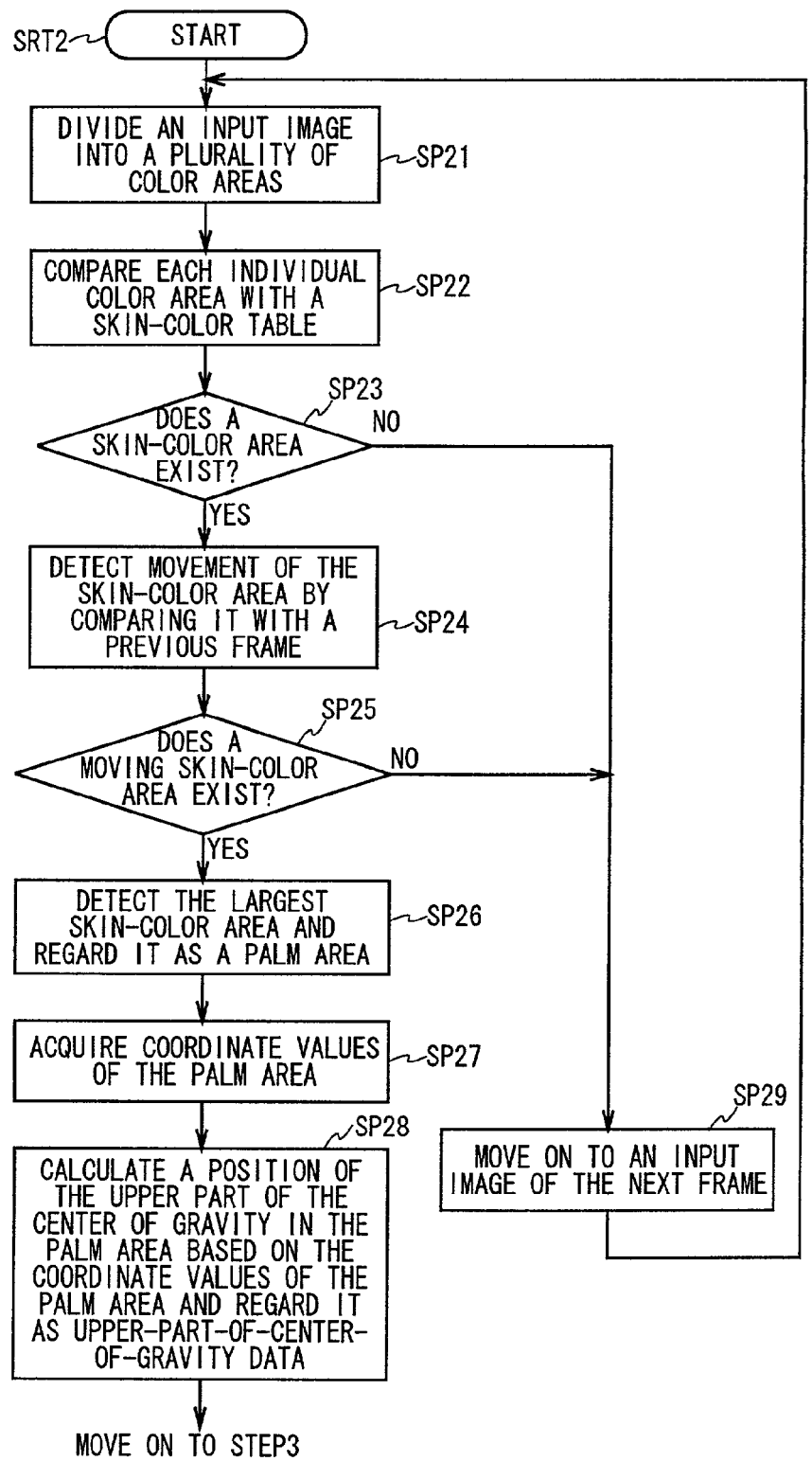
FIG. 9 is a flowchart showing a processing procedure for obtaining information about a hand position.

As shown in FIG. 9, at step SP21 of the subroutine SRT2, the CPU 50 divides the input image displayed in the gesture recognition display area 106 on the gesture recognition screen 100 into a plurality of color areas based on the color components, and then moves on to the next step SP22.

Figure 10:
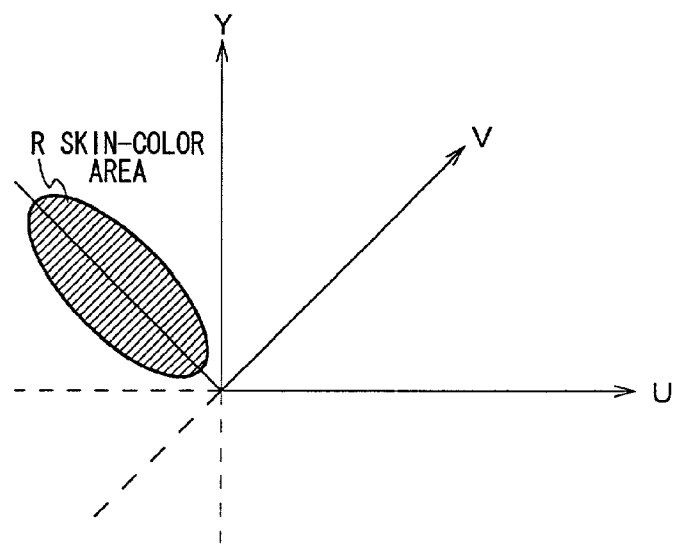
FIG. 10 is a schematic diagram showing a color area displayed in YUV chromatic space.

In this connection, the color area is expressed by predetermined YUV chromatic space, as shown in FIG. 10, and for example, a predetermined area of quadrants +Y, −U and −V indicated by oblique lines in the YUV chromatic space is regarded as a color area R (hereafter referred to as a skin-color area R) equivalent to color of a user's palm.

At step SP22, the CPU 50 compares a predetermined skin-color table corresponding to the skin-color area R in the YUV (brightness, color difference) chromatic space with the corresponding color areas of the input image, and then moves on to the next step SP23.

In this case, the color areas of the input image are roughly divided into the skin-color area R such as the user's face area and palm area and a non-skin-color area such as clothing.

At step SP23, the CPU 50 determines whether or not the skin color area R recognized as a skin-color exists in the input image, by comparing the skin-color table with the color areas of the input image.

If a negative result is obtained here, it represents that the skin-color area R matching the skin-color table does not exist in the input image, and then the CPU 50 moves on to the next step SP29.

At step SP29, the CPU 50 moves on to an input image of the next frame since the skin-color area R does not exist in the input image and the movement of the user's hand cannot be recognized, and returns to the above-mentioned step SP21.

On the contrary, if a positive result is obtained at step SP23, it represents that the skin-color area R matching the skin-color table exists, and then the CPU 50 moves on to the next step SP24.

At step SP24, the CPU 50 detects movement of the skin-color area R in the input image of the current frame based on change in coordinate values between the current frame and the previous frame, and then moves on to the next step SP25.

At step SP25, the CPU 50 determines whether or not the moving skin-color area R exists in the input image. If a negative result is obtained here, it represents that the moving skin-color area R does not exist in the input image, and then the CPU 50 moves on to the next step SP29, proceeds to the input image of the next frame and returns to the above-mentioned step SP21.

On the contrary, if a positive result is obtained at step SP25, it represents that the moving skin-color area R exists in the input image, and then the CPU 50 moves on to the next step SP26.

At step SP26, the CPU 50 detects the largest skin-color area R out of the moving skin-color areas R, and regards it as a palm area and then moves on to the next step SP27.

At step SP27, the CPU 50 acquires the coordinate values of the entire palm area determined at step SP26, and then moves on to the next step SP28.

At step SP28, the CPU 50 calculates the center of gravity of the palm area based on the coordinate values of the entire palm area obtained at step SP27, detects the coordinates of the uppermost of the palm area in a vertical direction with respective to the center of gravity, as the upper-part-of-center-of-gravity data equivalent to a fingertip of the hand, finishes a process of obtaining information about the hand position in the subroutine SRT2, and then returns to the step SP3 of the routine RT1 (FIG. 5).

At step SP3, the CPU 50 determines whether or not the user's hand exists in the gesture recognition display area 106 on the gesture recognition screen 100 based on the upper-part-of-center-of-gravity data obtained in the subroutine SRT2.

If a negative result is obtained here, it represents that the upper-part-of-center-of-gravity data is not obtained in the subroutine SRT2, that is, the user's hand does not exist in the gesture recognition display area 106 on the gesture recognition screen 100, and then the CPU 50 moves on to the next step SP4.

At step SP4, the CPU 50 displays an animation indicating that it is searching for the user's hand because the hand is not displayed in the gesture recognition display area 106 on the gesture recognition screen 100, and then returns to the above-mentioned step SP2.

Figure 11:
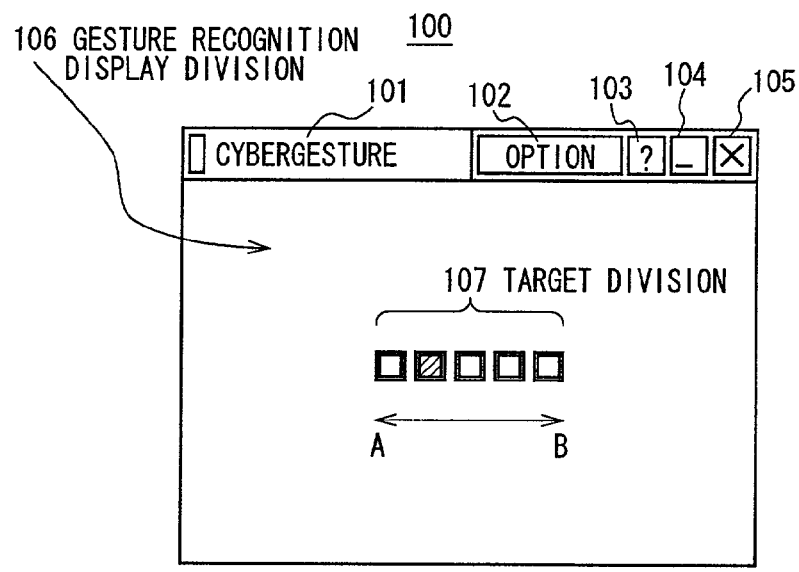
FIG. 11 is a schematic diagram showing the gesture recognition screen under a search state.

In this case, as shown in FIG. 11, the CPU 50 can display an animation by using the target division 107 to make the user easily recognize that it is searching for the skin-color area R since the user's skin-color portion is hardly displayed in the gesture recognition display area 106 on the gesture recognition screen 100 and the user's hand has not be recognized yet.

To be more specific, the CPU 50 produces a graduation effect by alternately coloring the areas (shown by broken lines) inside the frames 107AF to 107EF of the targets 107A to 107E in red in sequence in the left and right directions indicated by the arrows A and B, so that the user can easily visualize that the cyber gesture program has started up and the user's hand is being searched.

On the contrary, if a positive result is obtained at step SP3, it represents that the upper-part-of-center-of-gravity data has been obtained in the subroutine SRT2, that is, the user's hand exists in the gesture recognition display area 106 on the gesture recognition screen 100, and then the CPU 50 moves on to the next step SP5.

Figure 12:
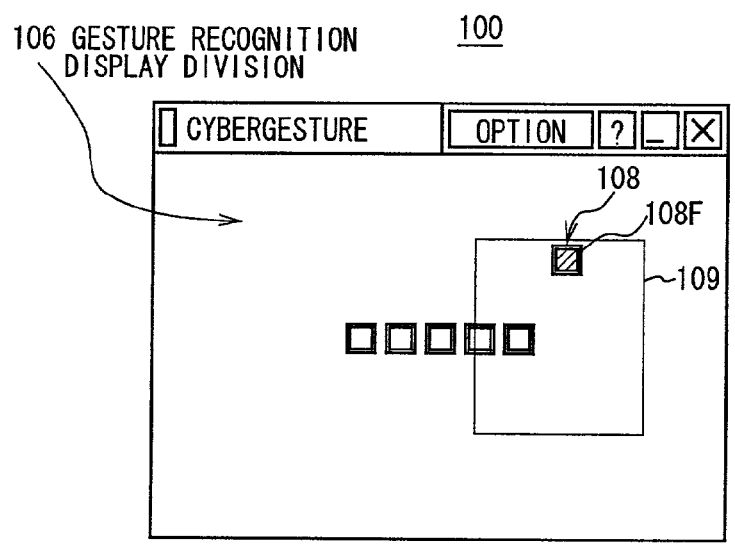
FIG. 12 is a schematic diagram showing the gesture recognition screen with a pointer and a palm area recognition frame overlapped thereon.

At step SP5, as shown in FIG. 12, the CPU 50 displays a pointer 108 of a predetermined shape at the position corresponding to the obtained upper-part-of-center-of-gravity data, and also overlaps and displays a palm area recognition frame 109 including the pointer 108 and covering the user's entire palm area, on the input image in the gesture recognition display area 106, and moves on to the next subroutine SRT3.

Here, the CPU 50 colors the palm area recognition frame 109 of 1-pixel width in white, and colors a pointer frame 108F of 1-pixel width of the pointer 108 which is the same in shape and size as the 107A to 107E of the target division 107, in white and also colors its inside in red.

As a result, the CPU 50 can make the user clearly distinguish between the targets 107A to 107E and the pointer 108 by coloring the frames 107AF to 107EF of the targets 107A to 107E in red and coloring the pointer frame 108F of the pointer 108 in white.

Moreover, the CPU 50 displays the palm area recognition frame 109 and the pointer 108 while moving them together with the movement of the user's hand.

Figure 13:
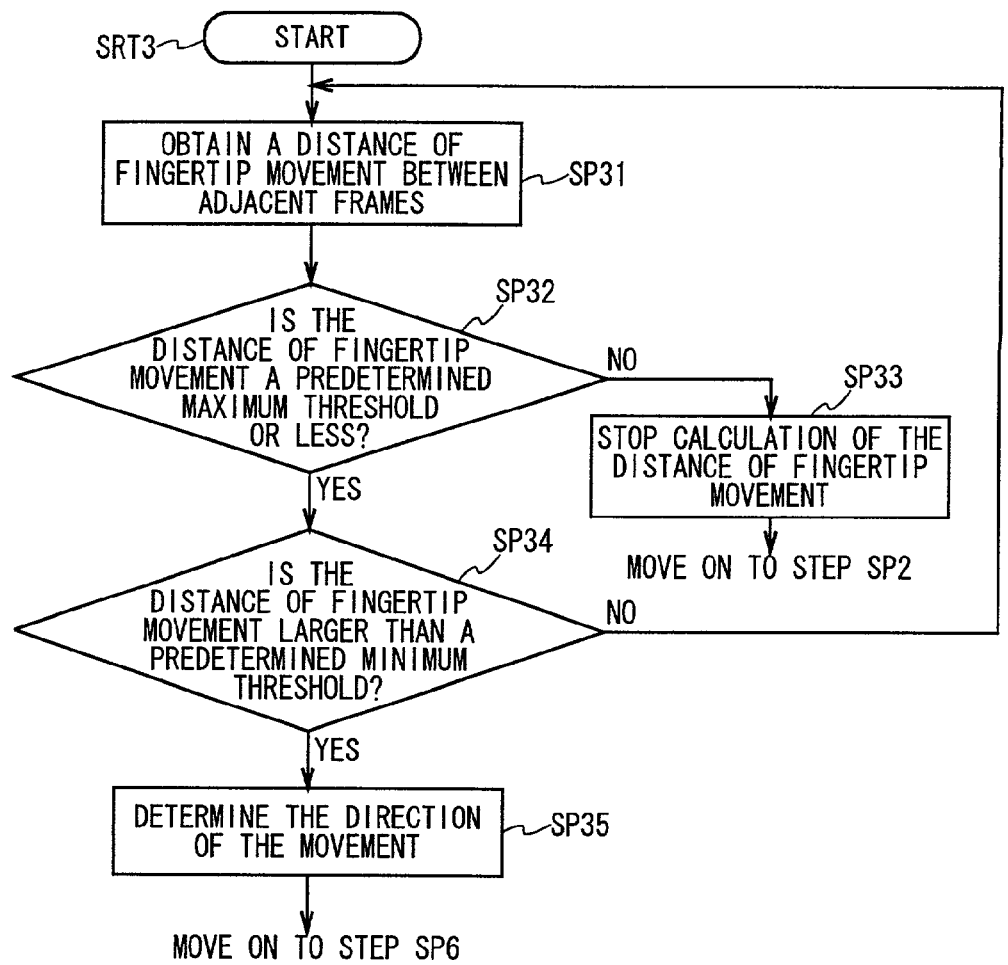
FIG. 13 is a flowchart showing a processing procedure for judging gesture movement.

As subsequently shown in FIG. 13, at step SP31 of the subroutine SRT3, the CPU 50 obtains a distance of fingertip movement based on the differences in the coordinate values of the upper-part-of-center-of-gravity data between adjacent frames, that is, the current frame stored in a ring buffer form in the RAM 53 and the previous frame adjacent to the current frame, and then moves on to the next step SP32.

At step SP32, the CPU 50 determines whether or not the distance of fingertip movement calculated at step SP31 is a predetermined maximum threshold or less. If a negative result is obtained here, it represents that the distance of fingertip movement is inadequate as data for recognizing movement of the hand because it is extremely distant between the position showing the fingertip in the previous frame and the position showing the fingertip in the current frame, and then the CPU 50 moves on to the next step SP33.

At step SP33, the CPU 50 stops the calculation of the distance of fingertip movement between adjacent frames after step SP34 and thereafter since the distance of fingertip movement is inadequate to use as data, and returns to step SP2 of the routine RT1 (FIG. 5) to repeat the above-mentioned process.

On the contrary, if a positive result is obtained at step SP32, it represents that the distance of fingertip movement is adequate as data for recognizing movement of the hand because it is not extremely distant between the position showing the fingertip in the previous frame and the position showing the fingertip in the current frame, and then the CPU 50 moves on to the next step SP34.

Figure 14:
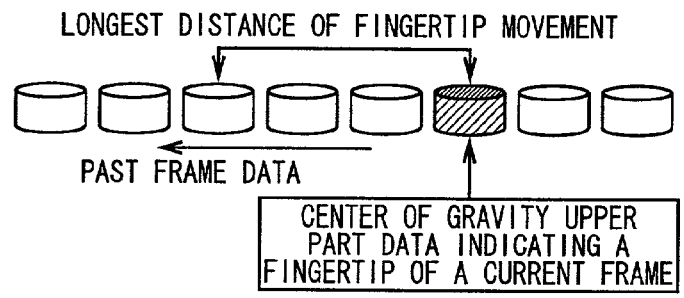
FIG. 14 is a schematic diagram explaining calculation of a distance of fingertip movement.

At step SP34, as shown in FIG. 14, the CPU 50 obtains as a longest distance of fingertip movement, the longest length in coordinate values between the upper-part-of-center-of-gravity data indicating the fingertip in the current frame and the upper-part-of-center-of-gravity data indicating the fingertip in an arbitrary past frame selected out of several past frames for a predetermined time, which are sequentially stored in the ring buffer form, and determines whether or not the longest distance of fingertip movement is larger than a predetermined minimum threshold.

If a negative result is obtained here, it represents that the longest distance of the fingertip movement based on state transition of the input image over a plurality of frames is smaller than the predetermined minimum threshold, that is, the movement of the hand is not enough to be recognized, and then the CPU 50 excludes the longest distance of fingertip movement from the recognizing process and returns to step SP31 to repeat the above-mentioned process.

On the contrary, if a positive result is obtained at step SP34, it represents that the longest distance of the fingertip movement is larger than the predetermined minimum threshold, that is, the fingertips certainly moved to the right or left, and then the CPU 50 moves on to the next step SP35.

At step SP35, the CPU 50 detects the direction (rightward or leftward) of the fingertip movement based on a movement vector between the upper-part-of-center-of-gravity data indicating the fingertip in the current frame and the upper-part-of-center-of-gravity data indicating the fingertip in the past frame used when calculating the longest distance of the fingertip movement, and then returns to step SP6 of the routine RT1 (FIG. 5).

As the CPU 50 detected the longest distance of the fingertip movement and the movement direction thereof at step SP6, it determines whether or not the speed of movement of the detected entire palm area is exceeding a predetermined speed based on change per unit time in the coordinate values between pixel data of the current frame and pixel data of the previous frame of the detected entire palm area.

If a negative result is obtained here, it determines that the speed of movement of the detected entire palm area is not exceeding the predetermined speed, that is, it may be the face area rather than the palm area in reality since it is moving rather slowly, and returns to step SP2 again to repeat the above-mentioned process.

On the contrary, if a positive result is obtained at step SP6, it determines that the speed of movement of the detected entire palm area is exceeding the predetermined speed, that is, it is much more likely to be the palm area since it is moving rather fast, and moves on to the next step SP7.

In the above process, the CPU 50 can determine the palm area and the face area much more correctly in the case where there are two or more candidates that seem to be the palm area.

Figure 15:
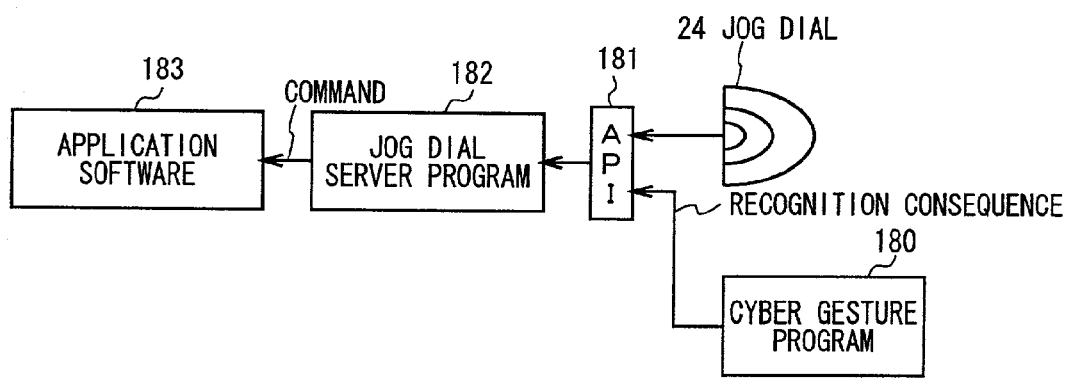
FIG. 15 is a schematic diagram explaining a processing flow as software.

At step SP7, as shown in FIG. 15, the CPU 50 supplies to a jog dial server program 182 the recognition result of gesture movement of the palm area recognized by a cyber gesture program 180, via an application programming interface (API) for a jog dial 181, and also performs visual feedback display of a trail indicating the movement of the hand (gesture) moved by the user and the recognizing process indicating how the notebook PC 1 recognized the gesture, on the gesture recognition screen 100, and moves on to the next step SP8.

Here, the API is a program interface for the application software by the OS, where the application software basically executes all processes via the API. In this connection, the API of the currently general OS takes the form of a function, and an appropriate argument (parameter) is specified by the application software to invoke the API's functions.

Incidentally, the CPU 50 takes in an operation of the jog dial 24 and the recognition result by the cyber gesture program 180 in the same input form, and supplies them to the jog dial server program 182 via the common API for a jog dial 181, so as to allow the software process to be simplified.

Figure 16A:
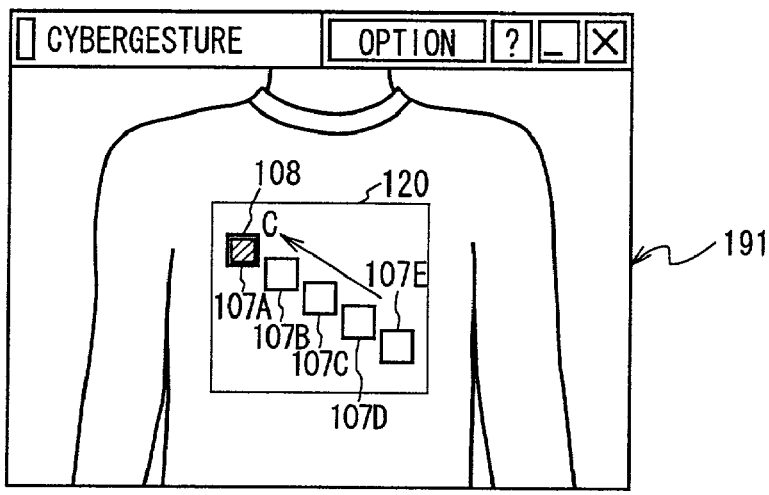
FIGS. 16A to 16C are schematic diagrams showing visual feedback screens.

In reality, the CPU 50 generates a visual feedback screen 191 as shown in FIG. 16A, and displays the pointer 108 with overlapped on the targets 107A to 107E obliquely placed in advance in a trail display frame 120 while moving it in a direction of an arrow C according to the trail indicating the movement of the hand (gesture) actually moved by the user so that the user can visually check the actual recognizing process of the movement of the user's hand on the visual feedback screen 191.

Figure 16B:
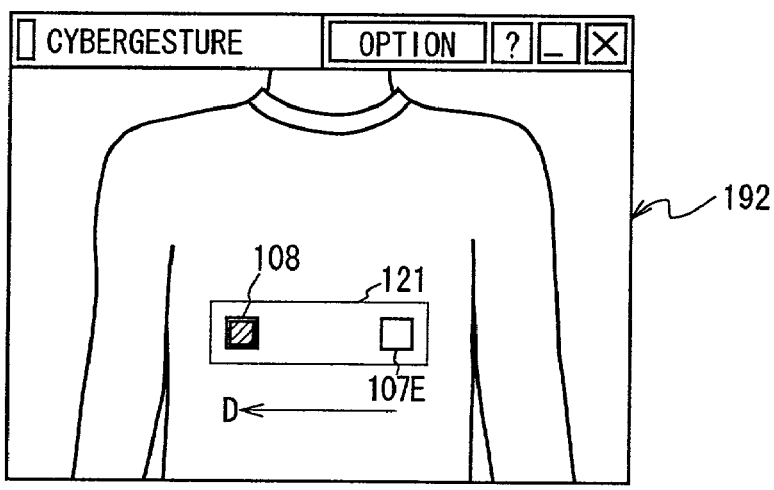

Subsequently, the CPU 50 creates a visual feedback screen 192 as shown in FIG. 16B, and displays it by replacing it with the visual feedback screen 191.

This visual feedback screen 192 deforms the trail display frame 120 in the visual feedback screen 191 to form a direction display frame 121 where the targets 107A to 107E are arranged in a horizontal line, and also displays the target 107E at the right end in the direction display frame 121 and the pointer 108 at the left end so as to sketchily indicate that the user's hand was moved in a direction of an arrow D (right to left) using the direction display frame 121.

Figure 16C:
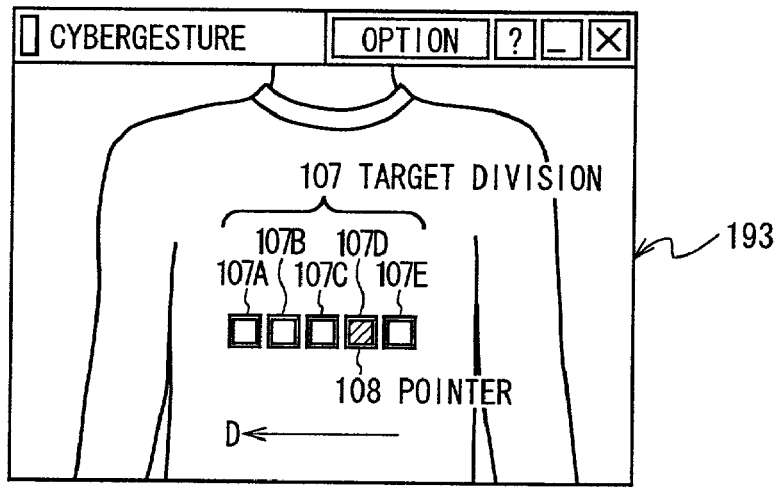

Lastly, the CPU 50 generates a visual feedback screen 193 as shown in FIG. 16C, and displays it by replacing it with the visual feedback screen 192.

This visual feedback screen 193 erases the direction display frame 121 on the visual feedback screen 192 and sequentially moves and displays the pointer 108 on the targets 107A to 107E, which are arranged in a horizontal line, in the direction shown by the arrow D, so that the user to easily recognize that the notebook PC 1 has recognized the user's hand moved from the right side to the left side (direction shown by the arrow D).

Moreover, in the case of moving and displaying the pointer 108 on the targets 107A to 107E in the direction shown by the arrow D, the CPU 50 moves the pointer 108 at the same speed as the movement of the recognized user's hand, so that the user can know the speed of movement of the hand that the notebook PC 1 can handle with.

At step SP8, the CPU 50 recognizes the movement of the user's hand and then supplies a predetermined command corresponding the movement of the hand, from the jog dial server program 182 (FIG. 15) to application software 183, to execute a predetermined process. The CPU 50, however, is executing a predetermined process according to the recognition result, so that it does not execute a gesture recognizing process for input images of several frames immediately after recognizing the movement of the hand, and returns to step SP2 again to repeat the above-mentioned process.

In this way, the CPU 50 can execute a process according to the movement of the user's hand on the active window without any malfunction and then execute a process according to the next movement of the user's hand.

As described above, the CPU 50 of the notebook PC 1 recognizes the movement of the user's hand by the cyber gesture program 180, and then supplies a predetermined command corresponding to the recognition result to the application software 183 by the jog dial server program 182, so as to execute the predetermined image forwarding operation according to the command on the active window screen based on the application software 183.

In reality, the CPU 50 of the notebook PC 1 forwards still pictures by only one on the active window screen displayed as the background on the gesture recognition screen 100 in the case of recognizing that the gesture of the hand is a movement from the left side to the right side (opposite direction of the arrow D) and on the other hand, plays back the still pictures by only one on the active window screen displayed as the background on the gesture recognition screen 100 in the case of recognizing that the gesture of the hand is a movement from the right side to the left side (direction shown by the arrow D).

In this way, the user can forward or play back the still pictures on the active window screen displayed as the background on the gesture recognition screen 100 just by holding his/her hand over the CCD camera 8 of the image pickup division 11 and moving either to the right or the left, even he/she does not directly manipulates the jog dial 24.

(1-4) Operations and Effects in the First Embodiment

In the above configuration, the CPU 50 of the notebook PC 1 displays a still picture on which the gesture recognition screen 100 is overlapped, on the active window screen by starting the cyber gesture program 180 in a state where the image editing program has started and the active window screen has been displayed on the liquid crystal display 10.

And the CPU 50 of the notebook PC 1 photographs the user existing in front of the display division 3, with the CCD camera 8 of the image pickup division 11, and displays the resultant input image in the gesture recognition display area 106 on the gesture recognition screen 100.

At this time, in order to recognize the movement of the user's hand, the CPU 50 of the notebook PC 1 first divides the input image in the gesture recognition display area 106 into a plurality of color areas to search for the skin-color area R therein. If the CPU 50 can not detect the skin-color area R, it produces a graduation effect by alternately coloring the areas inside the frames 107AF to 107EF of the targets 107A to 107E in the target division 107 (FIG. 11) in red in sequence in the left and right directions indicated by arrows A and B, so as to certainly notify the user that it is searching for the user's hand.

In this way, as the CPU 50 of the notebook PC 1 can make the user recognize that it has not recognized the movement of the hand yet, it can immediately prompt the user to perform an input operation such as holding his/her hand over the CCD camera 8 and moving either to the right or the left.

Thus, the CPU 50 of the notebook PC 1 can recognize the movement of the user's hand in a short time, generate a command according to the recognized movement of the hand, and forward or play back the still pictures displayed on the active window screen in response to the command.

According to the above configuration, in the case where the notebook PC 1 does not recognize the movement of the user's hand photographed by the CCD camera 8, it can certainly notify the user that it is searching for the user's hand and is in a recognizable standby state, by alternately coloring the areas inside the frames 107AF to 107EF of the targets 107A to 107E in red in sequence in the left and right directions indicated by arrows A and B.

Further, in the above configuration, the CPU 50 of the notebook PC 1 displays the still picture on which the gesture recognition screen 100 is overlapped, on the active window screen by starting the cyber gesture program 180 in a state where the image editing program has started and the active window screen has been displayed on the liquid crystal display 10.

At this time, the CPU 50 of the notebook PC 1 displays the target division 107 comprised of the five square targets 107A to 107E sequentially arranged in a horizontal line approximately at the center of the gesture recognition display area 106 on the gesture recognition screen 100.

Thereby, the CPU 50 of the notebook PC 1 makes the user easily visualize that the notebook PC 1 can recognize the right-and-left movement out of the movement directions of the user's hand, so that the CPU 50 can certainly notify the user of the recognizable movement direction in advance.

In addition, the CPU 50 of the notebook PC 1 can color the frames 107AF to 107EF of the targets 107A to 107E in red so as to make the user visually distinguish the targets 107A to 107E from the gray scale display as the background.

According to the above configuration, the notebook PC 1 can certainly notify the user in advance that the notebook PC 1 can recognize the right-and-left movement out of the movement directions of the user's hand by displaying the target division 107 comprised of the five square targets 107A to 107E sequentially arranged in a horizontal line approximately at the center of the gesture recognition display area 106 on the gesture recognition screen 100, by the cyber gesture program 180.

Furthermore, in the above configuration, the CPU 50 of the notebook PC 1 displays the still picture on which the gesture recognition screen 100 is overlapped, on the active window screen by starting the cyber gesture program 180 in a state wherein the image editing program has started and the active window screen has been displayed on the liquid crystal display 10.

And the CPU 50 of the notebook PC 1 photographs the user existing in front of the display division 3 with the CCD camera 8 of the image pickup division 11, and displays the resultant input image in the gesture recognition display area 106 on the gesture recognition screen 100 and also recognizes the movement of the user's hand to generate a command according to the movement of the recognized hand.

At this time, the CPU 50 of the notebook PC 1 obliquely places the targets 107A to 107E in a trail display frame 120 in advance as shown in FIG. 16A corresponding to the trail showing the movement of the hand actually made by the user (gesture), in order to allow the user to visually check the trail of the recognizing process of the movement of the user's hand by alternately moving and displaying the pointer 108 on the targets 107A to 107E in sequence in the direction shown by the arrow C.

After that, the CPU 50 deforms the trail display frame 120 as shown in FIG. 16B to form a direction display frame 121 in a state where the targets 107A to 107E are arranged in a horizontal line, and also displays the target 107E at the right end in the direction display frame 121 and the pointer 108 at the left end so as to sketchily indicate that the user's hand was moved in the direction shown by an arrow D (leftward).

Lastly, as shown in FIG. 16C, the CPU 50 erases the direction display frame 121 and moves and displays the pointer 108 on the targets 107A to 107E in the direction shown by the arrow D at the speed of movement of the recognized user's hand, so as to certainly notify the user that it recognized the movement of the user's hand from the right side to the left side (direction shown by the arrow D).

According to the above configuration, the notebook PC 1 can display the trail of the recognizing process and the recognition 9 result of the movement of the user's hand photographed by the CCD camera 8 as an animation using the targets 107A to 107E and the pointer 108, so as to make the user learn on how and in what recognizing process the movement of the user's hand was recognized, by feedback.

Thus, the user makes the notebook PC 1 recognize the movement of his/her hand, taking the direction and speed of the movement of the hand into consideration, so that an input operation of a command for forwarding images, for instance, can be performed in a short time.

(2) Second Embodiment (2-1) Overall Configuration of Network System

Figure 17:
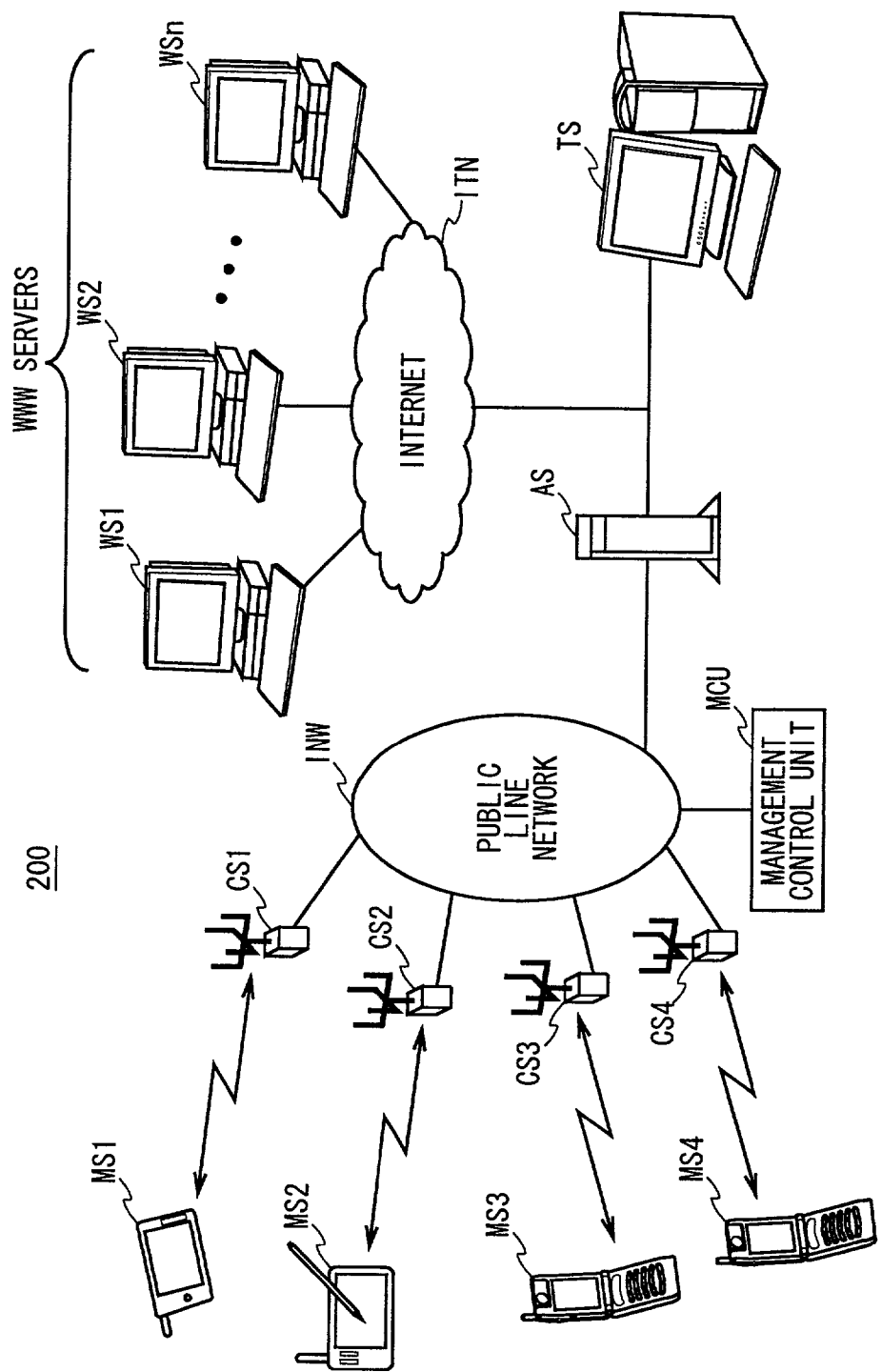
FIG. 17 is a schematic diagram showing an overall configuration of a network system in a second embodiment.

In FIG. 17, a reference numeral 200 shows, as a whole, a network system including a portable telephone MS3 to which the present invention is applied, in which base stations CS1 to CS4 which are fixed radio stations are set up in areas obtained by dividing a communication service area into a desired size.

These base stations CS1 to CS4 are connected by radio to personal digital assistants MS1 and MS2 and digital portable telephones with a camera MS3 and MS4 that are mobile radio stations by the code division multiple access method called a wideband-code division multiple access (W-CDMA) for instance, and can perform high-speed data communication of mass data at a maximum of data transfer rate of 2 Mbps by using 2 GHz frequency band.

Thus, the personal digital assistants MS1 and MS2 and the digital portable telephones with a camera MS3 and MS4 are capable of high-speed data communication of mass data by the W-CDMA method, so that they can realize various data communications such as sending and receiving electronic mail, viewing simple home pages, sending and receiving images, in addition to the audio communication.

In addition, the base stations CS1 to CS4 are connected to a public line network INW with a wire circuit, and the public line network INW is connected with the Internet ITN and a number of unillustrated subscriber's wire terminals, computer networks, local area networks and so on.

The public line network INW is also connected to an access server AS of an Internet service provider, and the access server AS is connected to a contents server TS owned by the Internet service provider.

This contents server TS provides contents such as a simple home page as a file in a compact hyper text markup language (HTML) format in response to a request from the subscriber's wire terminals, the personal digital assistants MS1 and MS2 and the digital portable telephones with a camera MS3 and MS4.

Incidentally, the Internet ITN is connected to a number of WWW servers WS1 to WSn, so that the WWW servers WS1 to WSn can be accessed from the subscriber's wire terminals, the personal digital assistants MS1 and MS2 and the digital portable telephones with a camera MS3 and MS4 in the TCP/IP protocol.

In this connection, when the personal digital assistants MS1 and MS2 and the digital portable telephones with a camera MS3 and MS4 perform communication, the communication between the devices MS1 to MS4 and the base stations CS1 to CS4 is performed in a 2 Mbps simple transport protocol, and the communication between the base stations CS1 to CS4 and the WWW servers WS1 to WSn via the Internet ITN is performed in the TCP/IP protocol.

Moreover, a management control unit MCU is connected to the subscriber's wire terminals, the personal digital assistants MS1 and MS2 and the digital portable telephones with a camera MS3 and MS4 with he public line network INW so as to perform identification and accounting processes for the subscriber's wire terminals, the personal digital assistants MS1 and MS2 and the digital portable telephones with a camera MS3 and MS4.

(2-2) Exterior Features of a Digital Portable Telephone with a Camera

Figure 18:
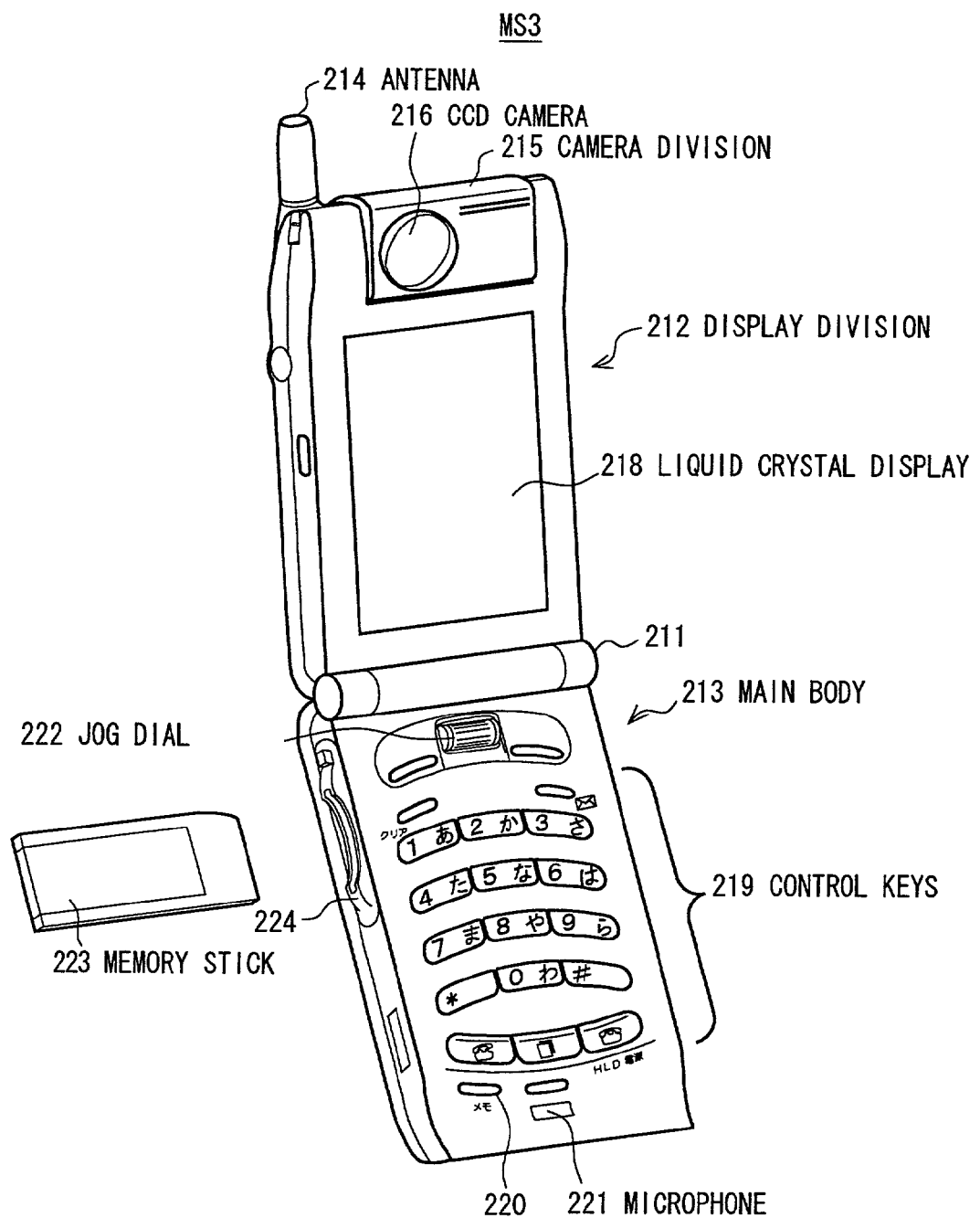
FIG. 18 is a schematic perspective view showing exterior features of a digital portable telephone with a camera.

Next, the exterior features of the digital portable telephone with a camera MS3 to which the present invention is applied will be described. As shown in FIG. 18, the digital portable telephone with a camera MS3 is divided into a display division 212 and a main body 213 bordered with a hinge division 211 at the center, and is formed to be folded down the hinge division 211.

The display division 212 has an antenna 214 for transmission and reception mounted at the upper-left so as to be drowned or contained, so that radio waves can be sent and received to and from the base station CS3 via the antenna 214.

The display division 212 also has a camera division 215 mounted at the upper-center which is rotatable within an angular range of approximately 180°, so that a desired subject to be photographed can be photographed by the CCD camera 216 of the camera division 215.

Figure 19:
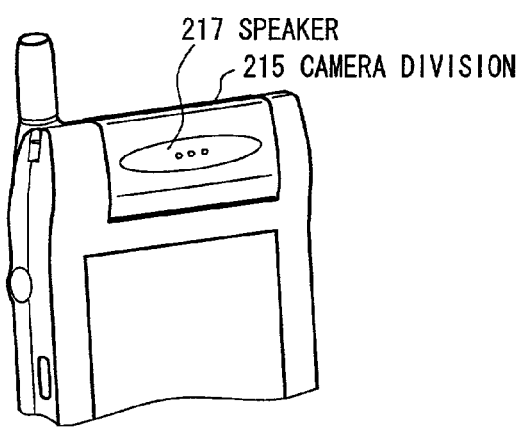
FIG. 19 is a schematic perspective view showing a display division when the camera division is rotated.

Here, in the case where the camera division 215 is rotated and positioned by approximately 180° by the user, a speaker 217 of the display division 212 provided at the center of the backside as shown in FIG. 19 is positioned in front so as to switch to an ordinary audio communication state.

Furthermore, the display division 212 has a liquid crystal display 218 provided in front, which can display a radio wave receiving state, a remaining battery level, contact names, telephone numbers, an outgoing history and so on registered as a telephone book, and besides, contents of electronic mail, a simple home page, an image photographed by the CCD camera 216 of the camera division 215.

On the other hand, the main body 213 has control keys 219 including namely numeric keys of "0" to "9," a call key, a redial key, a clearing and power key, a clear key, an electronic mail key, on its surface, so that various instructions can be inputted by using the control keys 219.

The main body 213 also has a memo button 220 and a microphone 221 under the control keys 219, so that voice of the other party can be recorded with the memo button 220 and the user's voice during a call is collected with the microphone 221.

In addition, the main body 213 has a rotatable jog dial 222 above the control keys 219, stuck out a bit from the main body 213, to perform various operations including scroll operations of a telephone book list and electronic mail displayed on the liquid crystal display 218, a page turning operation of the simple home page and an image forwarding operation by the rotating operation of the jog dial 222.

For instance, as for the main body 213, if a desired telephone number is selected out of a plurality of telephone numbers on the telephone book list displayed on the liquid crystal display 218 by the rotating operation of the jog dial 222 by the user and the jog dial 222 is pushed into the main body 213, it determines the selected telephone number and automatically makes a call on the telephone number.

Moreover, the main body 213 has a battery pack placed on its backside (not shown), and if the clearing and power key is put in an ON state, power is supplied from the battery pack to each circuit division and it starts up in an operable state.

Incidentally, the main body 213 has a memory stick slot 224 for inserting a detachable Memory Stick (trademark of Sony Corp.) 223 therein at the upper part of the left side so that, if the memo button 220 is pressed, it can record voice of a communication party on the phone as well as the electronic mails, the simple home pages and the images photographed by the CCD camera 216 on the Memory Stick 223 by the user's operation.

Here, the Memory Stick 223 is a kind of a flash memory card developed by Sony Corp., the applicant hereof. This Memory Stick 223 is a small and slim plastic case of 21.5 mm high × 50 mm wide × 2.8 mm thick containing a flash memory element that is a kind of electrically erasable and programmable read only memory (EEPROM), namely a nonvolatile memory capable of electrically rewriting and erasing, and it allows various data such as images, audio and music to be written and read via a 10-pin terminal.

In addition, the Memory Stick 223 adopts a unique serial protocol capable of securing compatibility with a used apparatus even in the case of a change of the built-in flash memory in specification such as enlarged capacity, and thus implements high performance of maximum writing speed of 1.5 MB/S and maximum reading speed of 2.45 MB/S and also secures high reliability by providing an erroneous erasure prevention switch.

As described above, the digital portable telephone with a camera MS3 can insert such a Memory Stick 223 therein, so that it can share data with other electronic apparatuses via the Memory Stick 223.

(2-3) Circuit Configuration of the Digital Portable Telephone with a Camera

Figure 20:
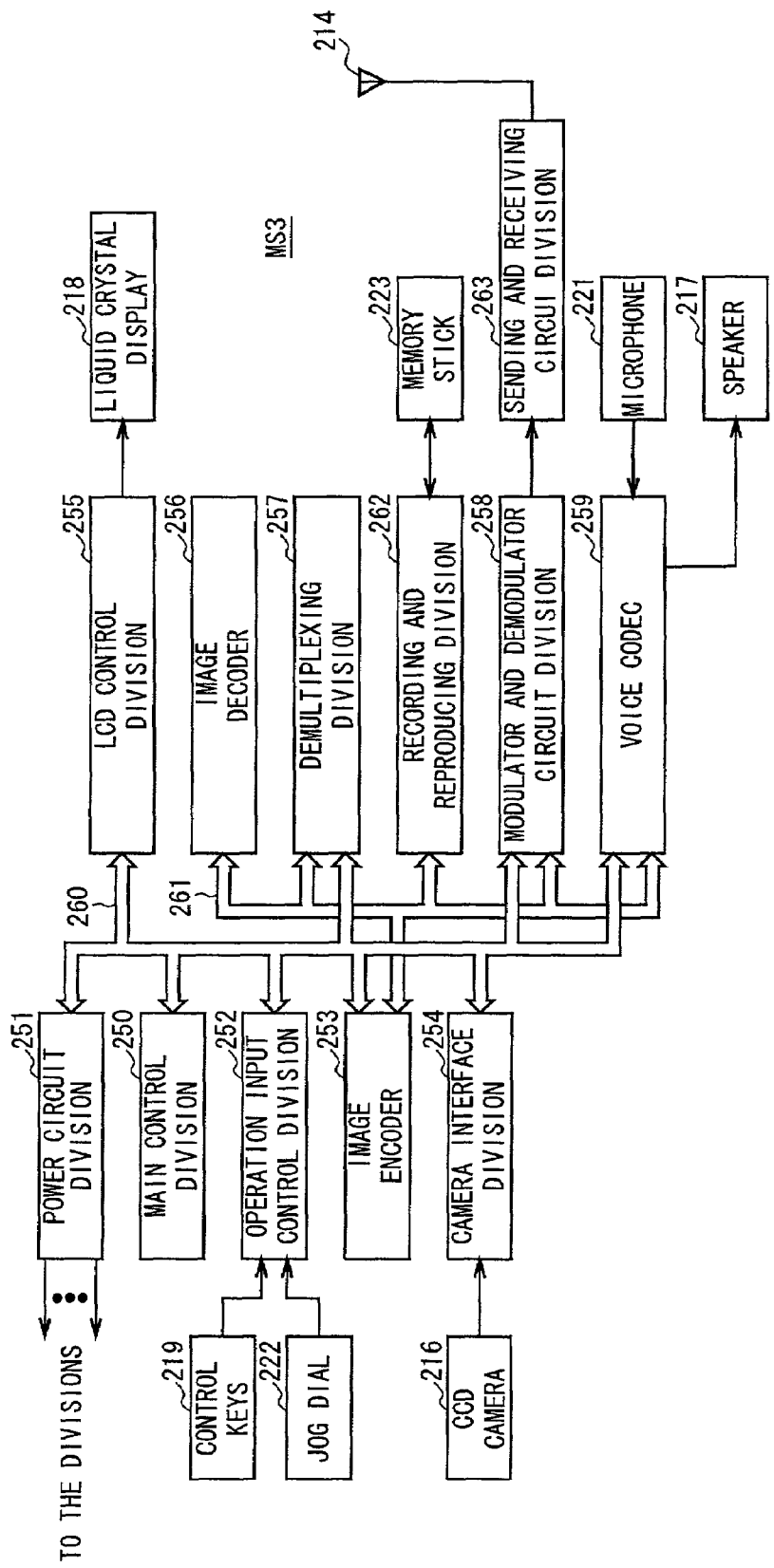
FIG. 20 is a block diagram showing a circuit configuration of the digital portable telephone with a camera.

As shown in FIG. 20, the digital portable telephone with a camera MS3 has the main control division 250 for centrally controlling the display division 212 and the main body 213 connected to a power circuit division 251, an operation input control division 252, an image encoder 253, a camera interface division 254, a liquid crystal display (LCD) control division 255, an image decoder 256, a demultiplexing division 257, a recording and reproducing division 262, a modulator and demodulator circuit division 258 and an audio CODEC 259 with a main bus 260, and also to the image encoder 253, the image decoder 256, the demultiplexing division 257, the modulator and demodulator circuit division 258 and the audio CODEC 259 with a synchronous bus 261.

When the clearing and power key is turned on by the user, the power circuit division 251 starts up the digital portable telephone with a camera MS3 in an operable state by providing power from the battery pack to each division.

Under the control of the main control division 250 comprised of the CPU, ROM, RAM and so on, the digital portable telephone with a camera MS3 converts an audio signal collected with the microphone 221 in an audio communication mode, into digital audio data through the audio CODEC 259 and performs a spread spectrum process on it at the modulator and demodulator circuit division 258, and performs digital-to-analog conversion and frequency conversion processes at the sending and receiving circuit division 263, and then sends it via the antenna 214.

In addition, the digital portable telephone with a camera MS3 amplifies a received signal received by the antenna 214 in the audio communication mode and performs frequency conversion and analog-to-digital conversion processes, performs a de-spread spectrum process at the modulator and demodulator circuit division 258 and converts it into an analog audio signal by the audio CODEC 259, and then outputs it via the speaker 217.

Furthermore, in the case of sending an electronic mail in a data communication mode, the digital portable telephone with a camera MS3 sends text data of the electronic mail inputted by operating the control keys 219 and the jog dial 222 to the main control division 250 via the operation input control division 252.

The main control division 250 performs the spread spectrum process on the text data at the modulator and demodulator circuit division 258 and performs digital-to-analog conversion and frequency conversion processes on it at the sending and receiving circuit division 263, and then sends it to the base station CS3 (FIG. 17) via the antenna 214.

On the other hand, in the case of receiving an electronic mail in the data communication mode, the digital portable telephone with a camera MS3 performs a de-spread spectrum process on the received signal, received from the base station CS3 via the antenna 214, at the modulator and demodulator circuit division 258 to restore the original text data, and then displays it as the electronic mail on the liquid crystal display 218 via the LCD control division 255.

It is also possible thereafter for the digital portable telephone with a camera MS3 to record the received electronic mail on the Memory Stick 223 via the recording and reproducing division 262 by the user's operation.

On the other hand, in the case of sending image data in the data communication mode, the digital portable telephone with a camera MS3 supplies the image data photographed by the CCD camera 216 to the image encoder 253 via the camera interface division 254.

In this connection, in the case of not sending the image data, it is also possible for the digital portable telephone with a camera MS3 to directly display the image data photographed by the CCD camera 216 on the liquid crystal display 218 via the camera interface division 254 and the LCD control division 255.

The image encoder 253 converts the image data supplied from the CCD camera 216 into coded image data by compression-coding it by a predetermined encoding method such as the moving picture experts group (MPEG) 2 or MPEG4, and sends the resultant to the demultiplexing division 257.

At this time, the digital portable telephone with a camera MS3 simultaneously sends the audio collected with the microphone 221 during photographing by the CCD camera 216 as digital audio data to the demultiplexing division 257 via the audio CODEC 259.

The demultiplexing division 257 multiplexes the coded image data supplied from the image encoder 253 and the audio data supplied from the audio CODEC 259 by a predetermined method, and performs the spread spectrum process on the resultant multiplexed data at the modulator and demodulator circuit division 258 and performs digital-to-analog conversion and frequency conversion processes on it at the sending and receiving circuit division 263, and then sends the resultant via the antenna 214.

On the other hand, in the case of receiving image data such as a simple home page in the data communication mode, the digital portable telephone with a camera MS3 performs the de-spread spectrum process on the received signal received from the base station CS3 via the antenna 214 at the modulator and demodulator circuit division 258 and sends the resultant multiplexed data to the demultiplexing division 257.

The demultiplexing division 257 demultiplexes the multiplexed data to divide it into coded image data and audio data, and supplies the coded image data to the image decoder 256 and also supplies the audio data to the audio CODEC 259, through the synchronous bus 261.

The image decoder 256 generates reproduction image data by decoding the coded image data by the decoding method corresponding to the predetermined encoding method such as MPEG2 or MPEG4, and displays it as, for instance, an image linked to the simple home page on the liquid crystal display 218 via the LCD control division 255.

At this time, the audio CODEC 259 converts the audio data into analog audio data, and then outputs it as, for instance, sounds linked to the simple home page via the speaker 217.

Also in this case, just as in the case of the electronic mail, the digital portable telephone with a camera MS3 can record the received image data of the simple home page on the Memory Stick 223 via the recording and reproducing division 262 by the user's operation.

In addition to such configuration, the digital portable telephone with a camera MS3 has the cyber gesture program 180 (FIG. 15) and the jog dial server program 182 which are the same as those in the first embodiment, in the ROM of the main control division 250, and it can overlap and display the gesture recognition screen 100 (FIG. 6) on the active window screen by the cyber gesture program 180 and also display an image of the user photographed by the CCD camera 216 in the gesture recognition display area 106 on the gesture recognition screen 100 while displaying the active window screen based on the predetermined application software 183 on the liquid crystal display 218.

Next, just as in the first embodiment and as shown in FIGS. 5 to 16, the digital portable telephone with a camera MS3 detects the skin-color area R in the user's image displayed in the gesture recognition display area 106 on the gesture recognition screen 100 under the control of the main control division 250, and recognizes the moving skin-color area R therein as the palm area, and then it supplies a predetermined command corresponding to the gesture movement of the palm area to the application software 183 by the jog dial server program 182.

Thus, just like the notebook PC 1 in the first embodiment, the digital portable telephone with a camera MS3 can forward or play back still pictures on the active window screen displayed as the background on the gesture recognition screen 100 by the application software 183 under the control of the main control division 250, in response to the command.

(2-4) Operations and Effects in the Second Embodiment

In the above configuration, the main control division 250 starts the cyber gesture program 180, and the digital portable telephone with a camera MS3 displays the target division 107 comprised of the five square targets 107A to 107E arranged in a horizontal line approximately at the center of the gesture recognition display area 106 on the gesture recognition screen 100.

At this time, just as in the first embodiment, in the case where the digital portable telephone with a camera MS3 cannot recognize the right and left movement of the user's hand, it produces a graduation effect by alternately coloring the areas inside the frames 107AF to 107EF of the targets 107A to 107E in red in sequence in the left and right directions indicated by the arrows A and B so as to certainly notify the user that it is searching for the user's hand.

In this way, the digital portable telephone with a camera MS3 can prompt the user to perform an input operation for recognizing the movement of his/her hand, so that it can recognize the movement of the user's hand in a short time, and can generate a command according to the recognized movement of the hand, and then forward or play back the still pictures displayed on the active window screen in response to the command.

According to the above configuration, in the case where the digital portable telephone with a camera MS3 does not recognize the movement of the user's hand photographed by the CCD camera 216, it can certainly notify the user that it is searching for the user's hand and is in a recognizable standby state by alternately coloring the areas inside the frames 107AF to 107EF of the targets 107A to 107E in red in sequence in the left and right directions indicated by the arrows A and B.

Further, in the above configuration, the main control division 250 starts the cyber gesture program 180, and the digital portable telephone with a camera MS3 displays the target division 107 comprised of the five square targets 107A to 107E arranged in a horizontal line approximately at the center of the gesture recognition display area 106 on the gesture recognition screen 100.

Therefore, just as in the first embodiment, the digital portable telephone with a camera MS3 can make the user visualize that the digital portable telephone with a camera MS3 can recognize the right-and-left movement of the user's hand, so that the user can certainly recognize the recognizable movement direction in advance.

In addition, the digital portable telephone with a camera MS3 can color the frames 107AF to 107EF of the targets 107A to 107E in red so as to make the targets 107A to 107E more visually remarkable against the gray scale display as the background.

According to the above configuration, the digital portable telephone with a camera MS3 can certainly notify the user in advance that the digital portable telephone with a camera MS3 can recognize the right-and-left movement of the user's hand by displaying the target division 107 comprised of the five square targets 107A to 107E sequentially arranged in a horizontal line approximately at the center of the gesture recognition display area 106 on the gesture recognition screen 100, by the cyber gesture program 180.

Furthermore, in the above configuration, the main control division 250 starts the cyber gesture program 180, and the digital portable telephone with a camera MS3 displays the target division 107 comprised of the five square targets 107A to 107E arranged in a horizontal line approximately at the center of the gesture recognition display area 106 on the gesture recognition screen 100.

Then, just as in the first embodiment, the digital portable telephone with a camera MS3 can recognize the right-and-left movement of the user's hand is moved and also allow the user to check the trail and the recognition result of the movement of the hand by moving and displaying the pointer 108 on the targets 107A to 107E in sequence according to the movement of the hand.

Thus, the digital portable telephone with a camera MS3 can make the user learn how to move his/her hand so that the his/her hand can be easily recognized by the digital portable telephone with a camera MS3 by feedback on the trail and the recognition resultant of the movement of the recognized user's hand, as a result, the time until a command is inputted by the user can be shortened.

According to the above configuration, the digital portable telephone with a camera MS3 can display the trail and the recognition resultant of the movement of the user's hand as a result of recognizing the movement of the hand photographed by the CCD camera 216, by an animation using the targets 107A to 107E and the pointer 108, so as to make the user learn by feedback on the trail and the recognition result of the movement of the hand.

(3) Other Embodiments

Moreover, while the above first and second embodiments described the cases where, when the notebook PC 1 and the digital portable telephone with a camera MS3 do not recognize the movement of the user's hand in the left and right directions, they notify the user that they do not recognize the movement of the hand by alternately coloring the areas inside the frames 107AF to 107EF of the targets 107A to 107E in red and in sequence in the left and right directions indicated by the arrows A and B on the gesture recognition screen 100 (FIG. 11) in the search state as a standby state image, the present invention is not limited thereto and it is also feasible to blink the targets 107A to 107E in sequence in the left and right directions indicated by the arrows A and B or to directly display "Cannot recognize the movement of your hand" on the liquid crystal display 10.

Moreover, while the above first and second embodiments described the cases where the notebook PC 1 and the digital portable telephone with a camera MS3 visually notify the user that they can recognize the right-and-left movement of the user's hand on the gesture recognition screen 100 as a recognizable movement direction image picture, the present invention is not limited thereto and it is also feasible to visually notify the user that the up-and-down movement can be recognized by the gesture recognition screen including the target division 107 arranged in a vertical line.

In addition, while the above first and second embodiments described the cases where the square targets 107A to 107E are used as marks of a predetermined shape displayed on the gesture recognition screen 100, the present invention is not limited thereto and it is also feasible to use various other shapes of targets such as circles, or arbitrary animation images.

In addition, while the above first and second embodiments described the cases where the user's movement is recognized as a recognition subject, the present invention is not limited thereto and it is also feasible to recognize movement of various recognition subjects such as a robot and an animal other than the user.

Furthermore, while the above first and second embodiments described the cases where the CPUs 50 and 250 as movement direction recognizing means and control means notify the user that they are in a recognizable standby state using the gesture recognition screen 100 based on the cyber gesture program 180 stored in advance on the hard disk of the HDD 67 or the ROM, the present invention is not limited thereto and it is also feasible, by inserting a program storage medium storing the cyber gesture program 180 into the notebook PC 1 and the digital portable telephone with a camera MS3, to notify the user that they are in a recognizable standby state.

Furthermore, while the above first and second embodiments described the cases where the CPUs 50 and 250 as movement direction recognizing means and control means notify the user of the recognizable movement direction in advance by displaying the gesture recognition screen 100 based on the cyber gesture program 180 stored in advance in the hard disk of the HDD 67 or the ROM, the present invention is not limited thereto and it is also feasible to display the above-mentioned gesture recognition screen 100 by inserting a program storage medium storing the cyber gesture program 180 into the notebook PC 1 and the digital portable telephone with a camera MS3.

Furthermore, while the above first and second embodiments describes the cases where the CPUs 50 and 250 as movement direction recognizing means and control means notify the user of the trail and the recognition result of the movement of the user's hand by displaying an animation in which the pointer 108 is moved and overlapped on the targets 107A to 107E according to the movement of his/her hand by the cyber gesture program 180 stored in advance in the hard disk of the HDD 67 or the ROM, the present invention is not limited thereto and it is also feasible to display an animation to notify the user of the movement and the recognition result of the user's hand by inserting a program storage medium storing the cyber gesture program 180 into the notebook PC 1 and the digital portable telephone with a camera MS3.

As the program storage medium used for installing the cyber gesture program 180 that is used to perform the above-mentioned series of processes in the notebook PC 1 and the digital portable telephone with a camera MS3 and executing it in the notebook PC 1 and the digital portable telephone with a camera MS3, not only package media such as a floppy disk, a compact disc-read only memory (CD-ROM) and a digital versatile disc (DVD) but also a semiconductor memory and a magnetic disk that store the cyber gesture program 180 temporarily or permanently can be used. In addition, as a means for storing the cyber gesture program 180 on these program storage media, wire and radio communication media such as a local area network, the Internet and digital satellite broadcasting can be utilized and it can also be stored via another various communication interface such as a router or a modem.

Moreover, while the above first and second embodiments described the cases where the information processing apparatuses in the present invention is applied to the notebook PC 1 and the digital portable telephone with a camera MS3, they can also be applied to other various information processing apparatuses such as personal digital assistants MS1 and MS2.

As mentioned above, the present invention allows, based on an image obtained by photographing a recognition subject by an image pickup means, to recognize the movement direction of the recognition subject and when generating a predetermined command corresponding to the movement direction of the recognition subject recognized, to create a predetermined standby state image while not recognizing the movement direction of the recognition subject, indicating the situation of searching for the recognition subject in the image and to display it on predetermined display means so as to certainly notify the user that the movement direction of the recognition subject is recognizable and the apparatus is in a standby state.

Further, as mentioned above, the present invention allows, before recognizing the movement direction of a recognition subject based on an image obtained by photographing the recognition subject by an image pickup means, to generate a predetermined recognizable movement direction image picture for making the user imagine a recognizable movement direction in advance and to display it on a predetermined display means so as to notify the user of the recognizable movement direction in advance using the recognizable movement direction image picture.

Furthermore, as mentioned above, the present invention allows, based on an image obtained by photographing a recognition subject by an image pickup means, to recognize the movement direction of the recognition subject in the image and generate a recognizing process image representing the trail of the movement direction of the recognized recognition subject and then display it on predetermined display means so as to make the user learn on how the movement of the recognition subject was recognized, by feedback.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. An information processing apparatus, comprising:
    a movement trail recognizing unit configured to, based on an image obtained by photographing a recognition subject by an image pickup unit, recognize the movement trail of said recognition subject;
    a control unit configured to generate a predetermined recognizable movement direction image picture in advance for making a user visualize said recognizable movement direction and displaying it on a predetermined display unit; and
    a transformation unit, configured to transform said movement trail recognized by said movement trail recognizing unit to correspond with said displayed predetermined recognizable movement direction.

2. The information processing apparatus according to claim 1, wherein said control unit notifies said user, by displaying as said recognizable movement direction image picture a plurality of marks of a predetermined shape sequentially arranged in a predetermined direction on said display unit, that said movement trail unit can recognize the movement direction of said recognition subject in said predetermined direction.

3. The information processing apparatus according to claim 2, wherein said control unit colors said marks of a predetermined shape in a different color from that of a background image on said display unit.

4. A method of showing a recognizable movement comprising:
    a movement trail recognizing step of, based on an image obtained by photographing a recognition subject by an image pickup unit, recognizing the movement trail of said recognition subject;
    an image generation processing step of, generating a predetermined recognizable movement trail image picture in advance for making a user visualize said recognizable movement direction which can be recognized by said movement direction recognizing processing step;
    a display processing step of displaying said recognizable movement direction image picture generated by said image generation processing step in predetermined display means;
    transforming said movement trail recognized by said movement trail recognizing step to correspond with said displayed predetermined recognizable movement direction.

5. A program storage medium causing an information processing apparatus to execute a program, wherein said program comprises:
    a movement trail recognizing processing step of, based on an image obtained by photographing a recognition subject by an image pickup unit, recognizing the movement trail of said recognition subject;
    an image generation processing step of, generating a predetermined recognizable movement direction image picture in advance for making a user visualize said movement recognizable direction which can be recognized by said movement direction recognizing processing step; and
    a display processing step of displaying said recognizable movement direction image picture generated by said image generation processing step on a predetermined display unit; and
    transforming said movement trail recognized by said movement trial recognizing step to correspond with said displayed predetermined recognizable movement direction.

6. The information processing apparatus according to claim 1, wherein the control unit is configured to, while not recognizing the movement trail of said recognition subject, generating a predetermined standby state image indicating that said movement trail recognizing unit is searching for said recognition subject in said image and displaying the standby state image on the predetermined display unit.

7. The information processing apparatus according to claim 6, wherein said control unit alternately displays, as said standby state image, a plurality of marks of a predetermined shape sequentially arranged in a predetermined direction, in said direction and in a reverse direction thereof in order.

* * * * *